US012772171B2

(12) United States Patent
Lee et al.

(10) Patent No.: US 12,772,171 B2
(45) Date of Patent: Oct. 20, 2026

(54) WAKE UP SIGNAL (WUS) MONITORING FRAMEWORK

(71) Applicant: QUALCOMM Incorporated, San Diego, CA (US)

(72) Inventors: Heechoon Lee, San Diego, CA (US); Zae Yong Choi, San Jose, CA (US); Scott Hoover, Del Mar, CA (US); Joshua Tennyson MacDonald, Superior, CO (US); Prem Swaroop Kadavakuduru, Poway, CA (US); Pawneet Singh, Erie, CO (US); Manikandan Carnagarin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 18/452,639

(22) Filed: Aug. 21, 2023

(65) Prior Publication Data

US 2025/0071681 A1 Feb. 27, 2025

(51) Int. Cl.

*H04W 52/02* (2009.01)
*H04W 24/10* (2009.01)
(Continued)

(52) U.S. Cl.

CPC ....... *H04W 52/0235* (2013.01); *H04W 24/10* (2013.01); *H04W 56/001* (2013.01); *H04W 76/28* (2018.02)

(58) Field of Classification Search

CPC ............. H04W 52/0235; H04W 24/10; H04W 56/001; H04W 76/28; H04W 52/0229;
(Continued)

(56) References Cited

U.S. PATENT DOCUMENTS

2019/0215895 A1* 7/2019 Huang .................. H04W 76/28
2022/0182943 A1* 6/2022 Maleki .............. H04W 52/0216
(Continued)

FOREIGN PATENT DOCUMENTS

WO WO-2023035657 A1 3/2023

OTHER PUBLICATIONS

International Search Report and Written Opinion—PCT/US2024/042941—ISA/EPO—Dec. 10, 2024 (2305917WO).

*Primary Examiner* — Gary Mui
*Assistant Examiner* — Nancy Sixto
(74) *Attorney, Agent, or Firm* — QUALCOMM Incorporated

(57) ABSTRACT

Methods, systems, and devices for wireless communications are described. A user equipment (UE) may receive, from a network entity, one or more control signals indicating information associated with a set of occasions for a transmission time interval (TTI) corresponding to a low power operation mode of the UE. For example, the set of occasions may include one or more of a wake up signal (WUS) monitoring occasion, a synchronization signal block (SSB) occasion, a channel state information (CSI) reporting occasion, and a discontinuous reception (DRX) on duration occasion. The UE may determine whether to skip the WUS monitoring occasion based on a respective duration and a respective start time for each occasion of the set of occasions associated with the information indicated by the one or more control signals.

28 Claims, 11 Drawing Sheets

(51) Int. Cl.
*H04W 56/00* (2009.01)
*H04W 76/28* (2018.01)

(58) Field of Classification Search
CPC . H04W 52/028; H04W 52/0216; Y02D 30/70
See application file for complete search history.

(56) References Cited

U.S. PATENT DOCUMENTS

| | | | | |
|---|---|---|---|---|
| 2022/0225151 | A1* | 7/2022 | Zhang | H04W 24/10 |
| 2023/0051303 | A1 | 2/2023 | Seo et al. | |
| 2024/0014870 | A1* | 1/2024 | Ben Hadj Fredj | H04B 7/0639 |
| 2024/0137868 | A1* | 4/2024 | Shubhi | H04W 52/0235 |
| 2024/0147368 | A1* | 5/2024 | Shubhi | H04W 52/0235 |
| 2025/0056411 | A1* | 2/2025 | Cheng | H04W 52/0245 |
| 2025/0151160 | A1* | 5/2025 | Fan | H04W 52/0216 |

* cited by examiner

WAKE UP SIGNAL (WUS) MONITORING FRAMEWORK

FIELD OF TECHNOLOGY

The following relates to wireless communications, including wake up signal (WUS) monitoring framework.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support wake up signal (WUS) monitoring framework. For example, the described techniques enable a user equipment (UE) to determine whether to skip a WUS monitoring occasion associated with a transmission time interval (TTI). For example, the UE may receive, from an associated network entity, one or more control signals that indicate information for a set of occasions (e.g., a WUS monitoring occasion, a synchronization signal block (SSB) occasion, a control state information (CSI) reporting occasion, and a discontinuous reception (DRX) on duration occasion). Based on a respective start time and respective duration for each of the set of occasions, the UE may determine or identify a set of parameters used to determine whether to skip or monitor a given WUS monitoring occasion. In some examples, the UE may perform a WUS evaluation procedure based on the durations and start times for one or more of the set of occasions. For example, if the UE identifies that a start time of the SSB occasion is after a start time of the DRX on duration occasion, the UE may operate in accordance with a first WUS evaluation procedure. If the UE identifies that a start time of the SSB occasion is prior a start time of the DRX on duration occasion, the UE may operate in accordance with a second WUS evaluation procedure.

Additionally, or alternatively, the UE may identify that a given TTI includes a DRX on duration occasion above a duration threshold and includes multiple periodic instances of the SSB occasion. In such examples, if the TTI additionally includes a CSI reporting occasion, the UE may operate in accordance with a third WUS evaluation procedure. If, however, the TTI is absent of a CSI reporting occasion, the UE may operate in accordance with a fourth WUS evaluation procedure. Additionally, or alternatively, the UE may further select which instance of the periodic SSB occasion to monitor during based on an whether the UE determines to skip or monitor during the WUS monitoring occasion.

A method for wireless communications by a UE is described. The method may include receiving one or more control signals indicating information associated with a set of occasions for a TTI corresponding to a low power operation mode of the UE, the set of occasions including a WUS monitoring occasion, a SSB occasion, a CSI reporting occasion, and a DRX on duration occasion and determining whether to skip the WUS monitoring occasion based on a respective duration and a respective start time for each occasion of the set of occasions associated with the information indicated by the one or more control signals.

A UE for wireless communications is described. The UE may include one or more memories storing processor executable code, and one or more processors coupled with the one or more memories. The one or more processors may individually or collectively operable to execute the code to cause the UE to receive one or more control signals indicating information associated with a set of occasions for a TTI corresponding to a low power operation mode of the UE, the set of occasions including a WUS monitoring occasion, a SSB occasion, a CSI reporting occasion, and a DRX on duration occasion and determine whether to skip the WUS monitoring occasion based on a respective duration and a respective start time for each occasion of the set of occasions associated with the information indicated by the one or more control signals.

Another UE for wireless communications is described. The UE may include means for receiving one or more control signals indicating information associated with a set of occasions for a TTI corresponding to a low power operation mode of the UE, the set of occasions including a WUS monitoring occasion, a SSB occasion, a CSI reporting occasion, and a DRX on duration occasion and means for determining whether to skip the WUS monitoring occasion based on a respective duration and a respective start time for each occasion of the set of occasions associated with the information indicated by the one or more control signals.

A non-transitory computer-readable medium storing code for wireless communications is described. The code may include instructions executable by a processor to receive one or more control signals indicating information associated with a set of occasions for a TTI corresponding to a low power operation mode of the UE, the set of occasions including a WUS monitoring occasion, a SSB occasion, a CSI reporting occasion, and a DRX on duration occasion and determine whether to skip the WUS monitoring occasion based on a respective duration and a respective start time for each occasion of the set of occasions associated with the information indicated by the one or more control signals.

In some examples of the method, UEs, and non-transitory computer-readable medium described herein, a first duration corresponds to a time between a start time of the WUS monitoring occasion and a start time of the DRX on duration occasion; a second duration corresponds to a time between the start time of the DRX on duration occasion and an end time for one of the CSI reporting occasion or a processing time of one or more SSBs received during the SSB occasion; a third duration corresponds to a time between a start time of the SSB occasion and the start time of the DRX on duration occasion; and a fourth duration corresponds to a time between the start time of the DRX on duration occasion and an end time for one of the DRX on duration occasion or the processing time of the one or more SSBs received during the SSB occasion.

In some examples of the method. UEs, and non-transitory computer-readable medium described herein, determining whether to skip the WUS monitoring occasion may include operations, features, means, or instructions for skipping the WUS monitoring occasion based on a sum of the first duration and the second duration being greater than the fourth duration.

In some examples of the method, UEs, and non-transitory computer-readable medium described herein, a start time of the SSB occasion may be after the start time of the DRX on duration occasion.

In some examples of the method, UEs, and non-transitory computer-readable medium described herein, receiving the one or more control signals may include operations, features, means, or instructions for receiving the one or more control signals indicating the information associated with the set of occasions, where the information indicates an absence of the SSB occasion for the TTI, and where, based on the absence of the SSB occasion for the TTI: the second duration corresponds to a time between the start time of the DRX on duration occasion and the end time of the CSI reporting occasion; and the fourth duration corresponds to a time between the start time of the DRX on duration occasion and the end time of the DRX on duration occasion.

In some examples of the method, UEs, and non-transitory computer-readable medium described herein, determining whether to skip the WUS monitoring occasion may include operations, features, means, or instructions for skipping the WUS monitoring occasion based on a first sum of the first duration and the second duration being greater than a second sum of the third duration and the fourth duration.

In some examples of the method, UEs, and non-transitory computer-readable medium described herein, the start time of the SSB occasion may be prior to the start time of the DRX on duration occasion.

In some examples of the method. UEs, and non-transitory computer-readable medium described herein, determining whether to skip the WUS monitoring occasion may include operations, features, means, or instructions for monitoring during the WUS monitoring occasion, where the one or more control signals further indicate a set of SSB occasions that includes the SSB occasion, the set of SSB occasions associated with monitoring for periodic transmission of one or more SSBs and monitoring for the one or more SSBs during a first SSB occasion of the set of SSB occasions based on a start time of the first SSB occasion being within a duration of a time window that spans the WUS monitoring occasion and the CSI reporting occasion.

In some examples of the method, UEs, and non-transitory computer-readable medium described herein, the information of the one or more control signals indicates an absence of the CSI reporting occasion for the TTI and the time window spans the WUS monitoring occasion based at least in part the absence of the CSI reporting occasion.

In some examples of the method, UEs, and non-transitory computer-readable medium described herein, determining whether to skip the WUS monitoring occasion may include operations, features, means, or instructions for skipping the WUS monitoring occasion, where the one or more control signals further indicate a set of SSB occasions that includes the SSB occasion, the set of SSB occasions associated with monitoring for periodic transmission of one or more SSBs and monitoring for the one or more SSBs during a first SSB occasion of the set of SSB occasions based on a start time of the first SSB occasion being within a duration from the DRX on duration occasion.

In some examples of the method, UEs, and non-transitory computer-readable medium described herein, the one or more control signals further indicate a set of SSB occasions that includes the SSB occasion; the set of SSB occasions may be associated with monitoring for a periodic transmission of one or more SSBs; a start time of a first SSB occasion of the set of SSB occasions may be prior to the WUS monitoring occasion; a start time of a second SSB occasion of the set of SSB occasions may be after the WUS monitoring occasion and prior to the DRX on duration occasion; an SSB period corresponds to a duration of time between the start time of the first SSB occasion and the second SSB occasion; the WUS monitoring occasion may be associated with a first lead time that may be directly prior to the WUS monitoring occasion; and the DRX on duration occasion may be associated with a second lead time that may be directly prior to the DRX on duration occasion.

In some examples of the method. UEs, and non-transitory computer-readable medium described herein, a first duration corresponds to the SSB period between the start time of the first SSB occasion and the second SSB occasion; a second duration corresponds to a time between a start time of the DRX on duration occasion and an end time of the CSI reporting occasion; a third duration corresponds a time between the start time of the DRX on duration occasion and an end time of the DRX on duration occasion, and determining whether to skip the WUS monitoring occasion may include operations, features, means, or instructions for skipping the WUS monitoring occasion based on a sum of the first duration and the second duration being greater than the third duration and on the second SSB occasion being after the first lead time and before the second lead time.

In some examples of the method, UEs, and non-transitory computer-readable medium described herein, the information of the one or more control signals indicates an absence of the CSI reporting occasion for the TTI; a first duration corresponds to a time between the start time of the first SSB occasion and an end time of the WUS monitoring occasion; a second duration corresponds to a time between the start time of the second SSB occasion and the end time of the DRX on duration occasion, and determining whether to skip the WUS monitoring occasion may include operations, features, means, or instructions for skipping the WUS monitoring occasions based on the first duration being greater than the second duration.

In some examples of the method. UEs, and non-transitory computer-readable medium described herein, the one or more control signals include one or more radio resource control signals, one or more system information signals, or a combination thereof.

Some examples of the method, UEs, and non-transitory computer-readable medium described herein may further include operations, features, means, or instructions for receiving, a radio resource control message that indicates for the UE to transmit a CSI report or a reference signal received power report regardless of starting a timer associated with the DRX on duration occasion, and indicates for the UE to refrain from waking up during the TTI if the UE does not receive a WUS during the WUS monitoring occasion and disabling a procedure to determine whether to skip the WUS monitoring occasion based on the radio resource control message and the CSI reporting occasion being within the DRX on duration occasion.

Some examples of the method, UEs, and non-transitory computer-readable medium described herein may further include operations, features, means, or instructions for transmitting an unsolicited CSI report or an unsolicited reference signal received power report based on disabling the procedure to determine whether to skip the WUS monitoring occasion.

DETAILED DESCRIPTION

Figure 1:
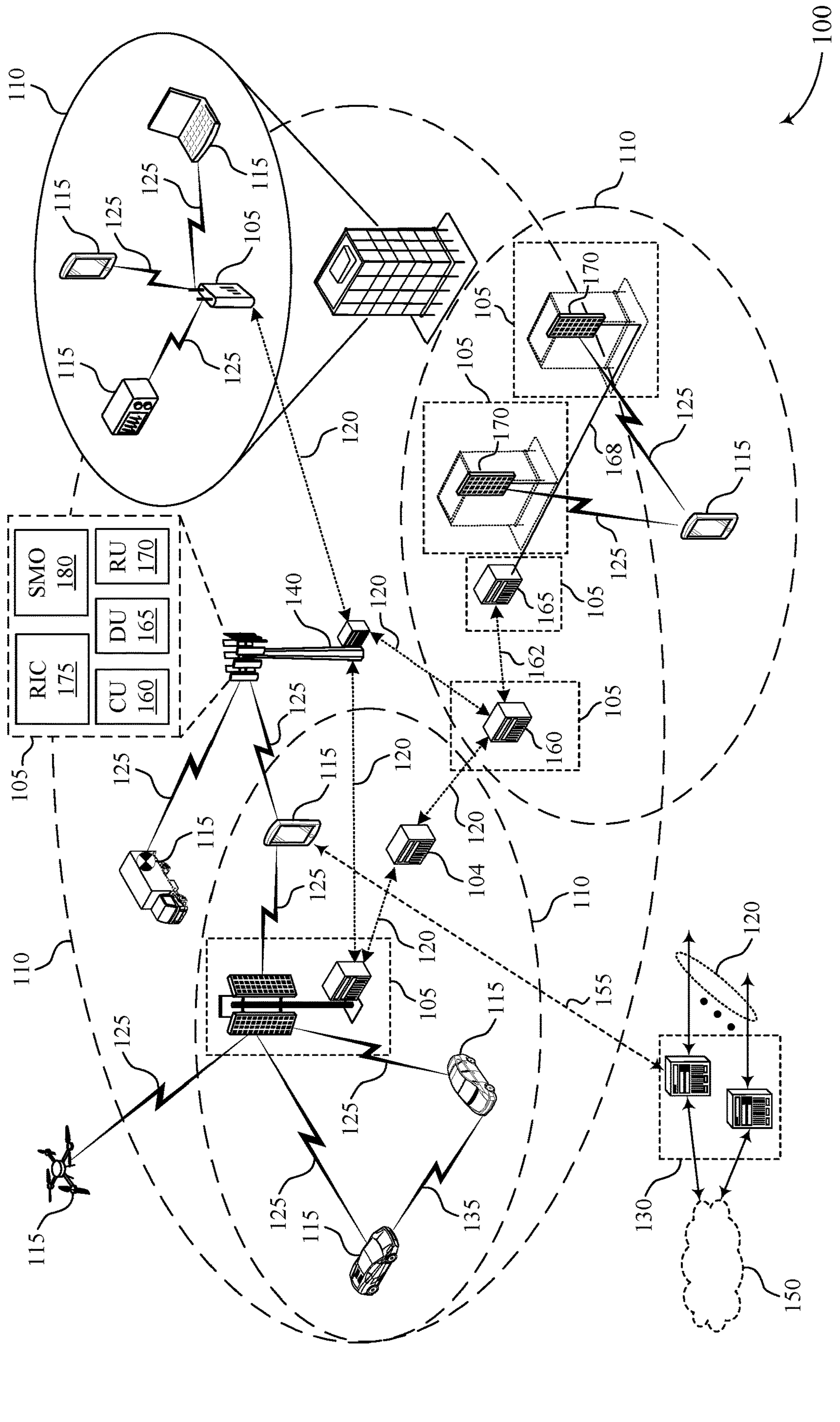
FIG. 1 shows an example of a wireless communications system that supports wake up signal (WUS) monitoring framework in accordance with one or more aspects of the present disclosure.

In some examples of wireless communications, a user equipment (UE) may operate in accordance with a power saving mode to conserve power and extend battery life. For instance, a UE may operate in accordance with a discontinuous reception (DRX) mode in which the UE cycles between an off duration (e.g., a receiver, transmitter, modem, etc. of the UE is inactive to reduce energy expenditure) and an on duration (e.g., in which the UE activates a receiver, transmitter, modem, etc. to identify if there is information ready for reception from or transmission to a network entity). In some cases, the UE may monitor for a wake-up signal (WUS) (e.g., during a WUS monitoring occasion), such that if the UE receives a WUS during the WUS monitoring occasion, the UE may wake up during a subsequent DRX on duration to receive signaling. As such, if the UE does not identify a WUS during the WUS occasion, the UE may skip the subsequent DRX on duration to further reduce energy expenditure. In some cases, however, monitoring during a WUS monitoring occasion may increase energy expenditure at the UE. For example, a UE may be configured to transmit control state information (CSI), monitor for one or more synchronization signal blocks (SSB), or both during a given DRX on duration. As such, monitoring during a WUS monitoring occasion may increase energy expenditure based on the UE being configured to wake up to perform one or more operations for CSI reporting and SSB monitoring.

According to the techniques described herein, a UE may determine whether to skip a WUS monitoring occasion associated with a transmission time interval (TTI). For example, the UE may receive, from an associated network entity, one or more control signals that indicate information for a WUS monitoring occasion, an SSB occasion, a CSI reporting occasion, a DRX on duration occasion, or any combination thereof. Based on a respective start time and respective duration for each of the set of occasions, the UE may determine parameters that may be used to determine to skip a given WUS monitoring occasion. In some examples, the WUS skipping manager may use a respective WUS evaluation procedure based on one or more characteristics of the set of parameters. For example, if the UE identifies that a start time of the SSB occasion is after a start time of the DRX on duration occasion, the UE may operate in accordance with a first WUS evaluation procedure. If the UE identifies that a start time of the SSB occasion is prior a start time of the DRX on duration occasion, the UE may operate in accordance with a second WUS evaluation procedure.

Additionally, or alternatively, the UE may identify that a given TTI includes a DRX on duration occasion above a duration threshold and includes multiple periodic instances of the SSB occasion. In such examples, if the TTI additionally includes a CSI reporting occasion, the UE may operate in accordance with a third WUS evaluation procedure. If, however, the TTI is absent of a CSI reporting occasion, the UE may operate in accordance with a fourth WUS evaluation procedure. Additionally, or alternatively, the UE may further select which instance of the periodic SSB occasion to monitor during based on an whether the UE determines to skip or monitor during the WUS monitoring occasion.

Aspects of the disclosure are initially described in the context of wireless communications systems, WUS evaluation procedures, and a process flow. Aspects of the disclosure are further illustrated by and described with reference to apparatus diagrams, system diagrams, and flowcharts that relate to WUS monitoring framework.

FIG. 1 shows an example of a wireless communications system 100 that supports WUS monitoring framework in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support WUS monitoring framework as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of wireless communications system 100, a UE 115 may determine whether to skip a WUS monitoring occasion associated with a TTI. For example, the UE 115 may receive from an associated network entity 105 one or more control signals that indicate information for a WUS monitoring occasion, an SSB occasion, a CSI reporting occasion, a DRX on duration occasion, or any combination thereof. Based on a respective start time and respective duration for each of the set of occasions, the UE 115 may determine parameters that may be usedto determine whether to skip a given WUS monitoring occasion. In some examples, the WUS skipping manager may use a respective WUS evaluation procedure based on one or more characteristics of the set of parameters. For example, if the UE 115 identifies that a start time of the SSB occasion is after a start time of the DRX on duration occasion, the UE 115 may operate in accordance with a first WUS evaluation procedure. If the UE 115 identifies that a start time of the SSB occasion is prior a start time of the DRX on duration occasion, the UE 115 may operate in accordance with a second WUS evaluation procedure.

Additionally, or alternatively, the UE 115 may identify that a given TTI includes a DRX on duration occasion above a duration threshold and includes multiple periodic instances of the SSB occasion. In such examples, if the TTI additionally includes a CSI reporting occasion, the UE 115 may operate in accordance with a third WUS evaluation procedure. If, however, the TTI is absent of a CSI reporting occasion, the UE 115 may operate in accordance with a fourth WUS evaluation procedure. Additionally, or alternatively, the UE 115 may further select which instance of the periodic SSB occasion to monitor during based on an whether the UE 115 determines to skip or monitor during the WUS monitoring occasion.

Figure 2:
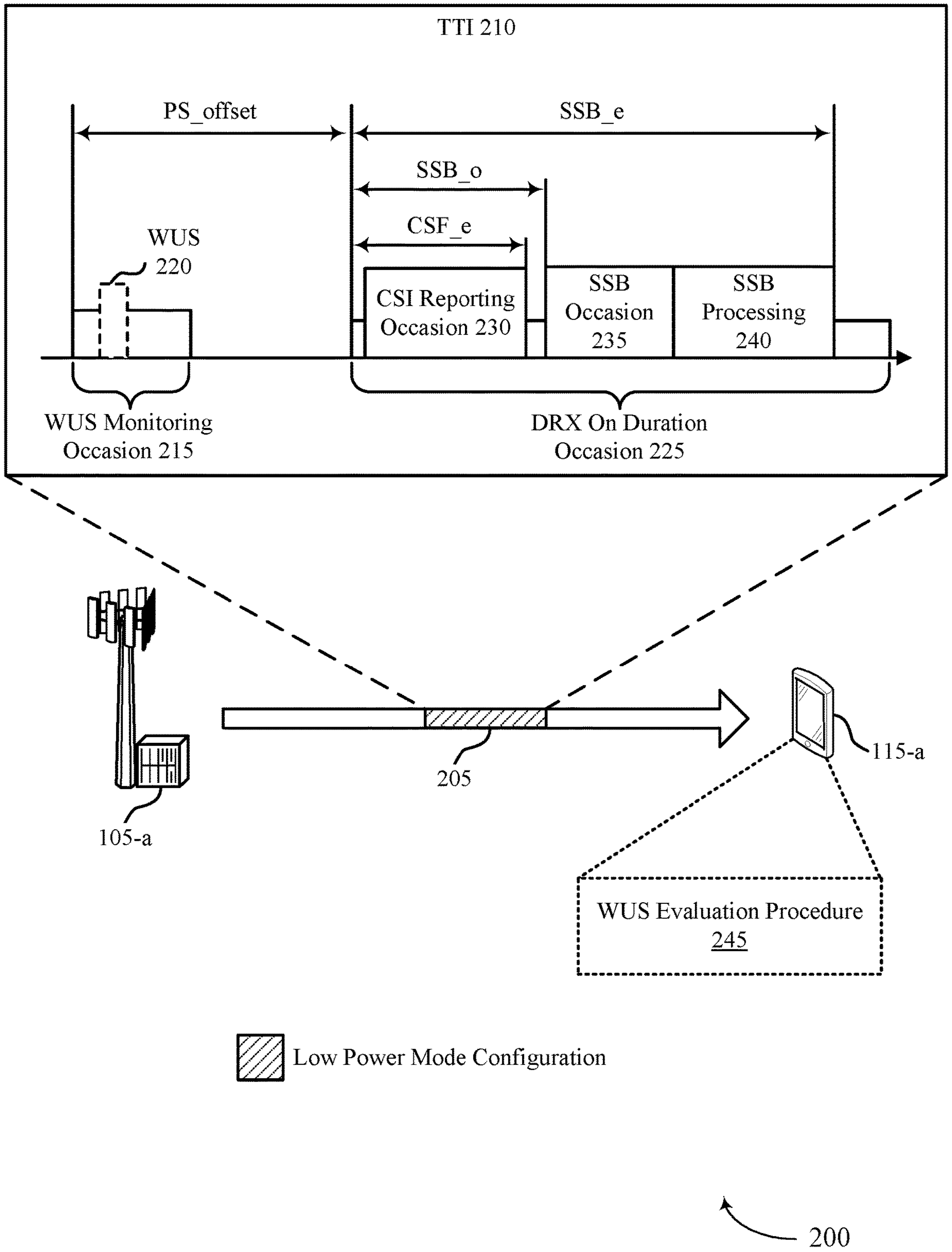
FIG. 2 shows an example of a wireless communications system that supports WUS monitoring framework in accordance with one or more aspects of the present disclosure.

FIG. 2 shows an example of a wireless communications system 200 that supports WUS monitoring framework in accordance with one or more aspects of the present disclosure. In some examples, the wireless communications system 200 may implement aspects of the wireless communications system 100. For example, the wireless communications system 200 may include a network entity 105-*a* and a UE 115-*a*, which may be examples of the corresponding devices described with reference to FIG. 1.

In some examples of wireless communications system 200, the UE 115-*a* may operate using power saving techniques or modes. For example, the UE 115-*a* may use a DRX mode (such as a connected DRX (CDRX) mode), where the UE 115-*a* periodically switches between an active reception state (e.g., an on duration of the DRX mode) and an inactive reception state (e.g., an off duration of the DRX mode). In some examples of the on duration of the DRX mode, the UE

115-*a* may power on a transceiver (or other components) to receive data, control signaling, or both from one or more wireless devices (e.g., the network entity 105-*a*). In some examples of the off duration of the DRX mode, the UE 115-*a* may reduce power expenditure at the transceiver by refraining from monitoring or receiving signaling (e.g., by deactivating the transceiver or other components). As illustrated in FIG. 2, the network entity 105-*a* may configure the UE 115-*a* with a DRX mode. For example, a low power mode configuration 205 may be indicated by one or more control signals (which may be transmitted by the network entity 105-*a*), where at least a first control signal indicates a DRX mode to the UE 115-*a*. In some examples, the at least one control signal may include information for a DRX cycle that indicates a start time, duration, and periodicity associated with an DRX on duration occasion 225.

In some examples, the UE 115-*a* may determine to refrain from powering on the transceiver during one or more instances of the DRX on duration occasion 225. For example, if the UE 115-*a* is not scheduled to receive data or control signaling during a given DRX on duration occasion 225, it may be advantageous for the UE 115-*a* to skip the given DRX on duration occasion 225 to reduce power expenditure. As such, the network entity 105-*a* may transmit a WUS 220 prior to a given DRX on duration occasion 225 to indicate whether the UE 115-*a* may transition to the active state during the DRX on duration occasion 225. For example, during a WUS monitoring occasion 215, the UE 115-*a* may monitor for the WUS 220, such that if the WUS 220 indicates a first value (e.g., a first bit value of '1' or '0') the UE 115-*a* may determine to transition to the active state during the associated DRX on duration occasion 225, and if the WUS 220 indicates a second value (e.g., the inverse of the first bit value), the UE 115-*a* may determine to remain in the inactive state to save power. As illustrated in FIG. 2, the network entity 105-*a* may configure the UE 115-*a* with one or more instances of a WUS monitoring occasion 215. For example, one or more control signals may indicate the low power mode configuration 205, where at least one control signal may indicate a start time, a duration, and a periodicity of the WUS monitoring occasion 215.

In some examples, the UE 115-*a* may perform one or more operations. For example, the network entity 105-*a* may configure the UE 115-*a* to perform CSI reporting. In some cases, CSI reporting may be a mechanism that enables the UE 115-*a* to provide feedback to the network entity 105-*a* corresponding to the quality and characteristics of a radio channel. For instance, the UE 115-*a* may measure various parameters related to the radio channel, such as channel quality, signal-to-noise ratio (SNR), received signal strength, and channel frequency response. Additionally, different types of CSI reporting may be used, including Wideband CSI (WCSI) and Narrowband CSI (NCSI), each offering different levels of granularity in the CSI. Based on collecting channel measurements, the UE 115-*a* may send CSI feedback to the network entity 105-*a* at regular intervals or when specific events occur, such as a change in the channel conditions or when requested by the network. The network entity 105-*a* may use the CSI feedback to adapt one or more transmission parameters to increase signal quality and reliability for the UE 115-*a*. As illustrated in FIG. 2, the network entity 105-*a* may configure the UE 115-*a* with one or more instances of a CSI reporting occasion 230. For example, one or more control signals may indicate the low power mode configuration 205, where at least one control signal may indicate a start time, a duration, and a periodicity of the CSI reporting occasion 230.

Additionally, or alternatively, the network entity 105-*a* may configure the UE 115-*a* for monitoring and receiving SSBs. For instance, the UE 115-*a* may use SSB monitoring to synchronize with cell reference signals from the network entity 105-*a* and discover available cells associated with the network. For example, the network entity 105-*a* may periodically transmit an SSB to help the UE 115-*a* detect and identify neighboring cells and find the most suitable cell to connect to. In some examples, an SSB may include information such as cell identity, time and frequency synchronization, and CSI. In some cases, a respective SSB may be associated with a respective beam in the beamforming domain, where different beams cover different angles and directions, and the UE 115-*a* may monitor multiple beams to detect all the SSBs transmitted by neighboring cells. Based on receiving an SSB, the UE 115-*a* may extract the synchronization and reference information, including the cell identity and timing (e.g., as part of an SSB processing 240), which the UE 115-*a* may use for cell selection and handover procedures. As illustrated in FIG. 2, the network entity 105-*a* may configure the UE 115-*a* with one or more instances of an SSB occasion 235, during which the UE 115-*a* may monitor for one or more SSBs. For example, one or more control signals may indicate the low power mode configuration 205, where at least one control signal may indicate a start time, a duration, and a periodicity of the SSB occasion 235.

As described herein, the one or more control signals may collectively indicate information related to each of the type of occasions described (e.g., WUS monitoring occasion 215, DRX on duration occasion 225, CSI reporting occasion 230, and SSB occasion 235). For example, the network entity 105-*a* may include information for each occasion in separate control signals, a same control signal, or a combination thereof. Additionally, or alternatively, the one or more control signals used may be examples of system information (SI), RRC configuration signaling, MAC signaling, downlink control information (DCI), or a combination thereof). For instance, the network entity may configure the SSB occasion 235 via SI or RRC signaling, configure the CSI reporting occasion 230 via RRC signaling, configure the WUS monitoring occasion 215 via RRC signaling, and configure the DRX on duration occasion 225 via SI or RRC signaling. Additionally, or alternatively, the network entity 105-*a* may update the information associated with one or more of the types of occasions using a second set of one or more control signals (e.g., RRC reconfiguration or SI reconfiguration).

In some cases, the UE 115-*a* may use the information from the one or more control signals to determine parameters related to each of the occasions. For instance, a parameter PS_offset may correspond to a duration between the start time of the WUS monitoring occasion 215 and the start time of the DRX on duration occasion 225. A parameter CSF_e may correspond to a duration between the start time of the DRX on duration occasion 225 and the end time of the CSI reporting occasion 230. A parameter SSB_o may correspond to a duration between the start time of the DRX on duration occasion 225 and the start time of the SSB occasion 235. A parameter SSB_e may correspond to a duration between the start time of the DRX on duration occasion 225 and an end time of an SSB processing 240 associated with receiving an SSB during the SSB occasion 235.

According to the techniques described herein, the UE 115-*a* may use the parameters (e.g., PS_offset, CSF_e, SSB_o, SSB_e, among other parameters) to determine whether to skip the WUS monitoring occasion 215 for a given TTI 210. For example, if the UE 115-*a* is scheduled with the SSB occasion 235, the CSI reporting occasion 230, or both for a given TTI 210, the UE 115-*a* may transition to the active state for the WUS monitoring occasion 215 and remain in the active state until the CSI reporting or the SSB processing 240 is complete. As such, the UE 115-*a* may use a WUS evaluation procedure 245 to determine whether to skip a WUS monitoring occasion 215 for a given TTI 210.

Figure 3A:
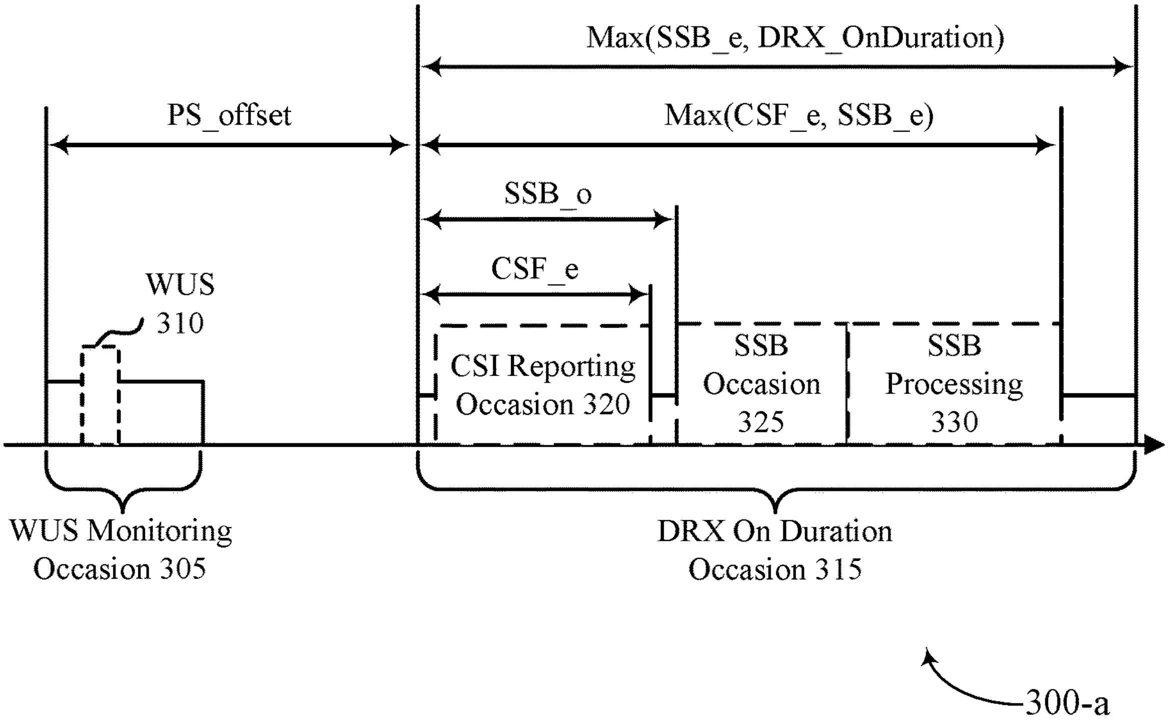
FIGS. 3A and 3B each show a respective example of a WUS evaluation procedure that supports WUS monitoring framework in accordance with one or more aspects of the present disclosure.

If the start time of the SSB occasion 235 is after the start time of the DRX on duration occasion 225 (e.g., SSB_o>0), the UE 115-*a* may operate in accordance with the techniques described in FIG. 3A. If the start time of the SSB occasion 235 is prior to the start time of the DRX on duration occasion 225 (e.g., SSB_o<0), the UE 115-*a* may operate in accordance with the techniques described in FIG. 3B.

Additionally, or alternatively, the DRX on duration occasion 225 may be above a threshold (e.g., a large DRX cycle), and based on the periodicity of the SSB occasion 235, there may be a first SSB occasion 235 prior to the WUS monitoring occasion 215 and second SSB occasion 235 after the WUS monitoring occasion 215 and prior to the DRX on duration occasion 225. In such examples, the UE 115-*a* may determine which SSB occasion 235 to monitor during and whether to skip the WUS monitoring occasion 215 in accordance with the techniques of FIG. 4A, FIG. 4B, or both.

Additionally, or alternatively, the UE 115-*a* may determine to disable the WUS evaluation procedure 245 (e.g., disable WUS skipping) based on the one or more control signals that indicate the low power mode configuration 205. For example, the UE 115-*a* may receive a control message, such as an RRC message that semi-statically indicates one or more parameters associated with the DRX on duration occasion 225, the CSI reporting occasion 230, or both. The RRC message may include a parameter ps_Transmit (e.g., ps_TransmitPeriodicCSI for a CSI report or a ps_TransmitPeriodicL1_RSRP for an RSRP report), where a first value (e.g., 1) indicates for the UE 115-*a* to transmit a periodic CSI report or L1-RSRP report based on starting a timer for the DRX on duration occasion 225 (e.g., indicated by WUS 220), and a second value (e.g., 0) indicates for the UE transmit a periodic CSI report or L1-RSRP report regardless of starting the timer for the DRX on duration occasion 225. The RRC message may include a parameter ps_wakeup where a first value (e.g., 1) may indicate for the UE 115-*a* to wakeup if WUS is not detected during one or more monitoring occasions outside of the UE 115-*a* active time and a second value (e.g., 0) may indicate for the UE 115-*a* to not wakeup if the WUS is not detected during one or more monitoring occasions outside of the UE 115-*a* active time. In some examples, if ps_Transmit=0, ps_wakeup=0, and a periodic CSI report or an RSRP report is scheduled for the DRX on duration occasion 225, the UE 115-*a* may disable the WUS evaluation procedure 245. Alternatively, the UE 115-*a* may determine to skip the WUS monitoring occasion 215, based on the above conditions, and transmit an unsolicited periodic CSI report or RSRP report to the network entity 105-*a* (e.g., even if the network entity 105-*a* is not expecting the report).

Figure 3B:
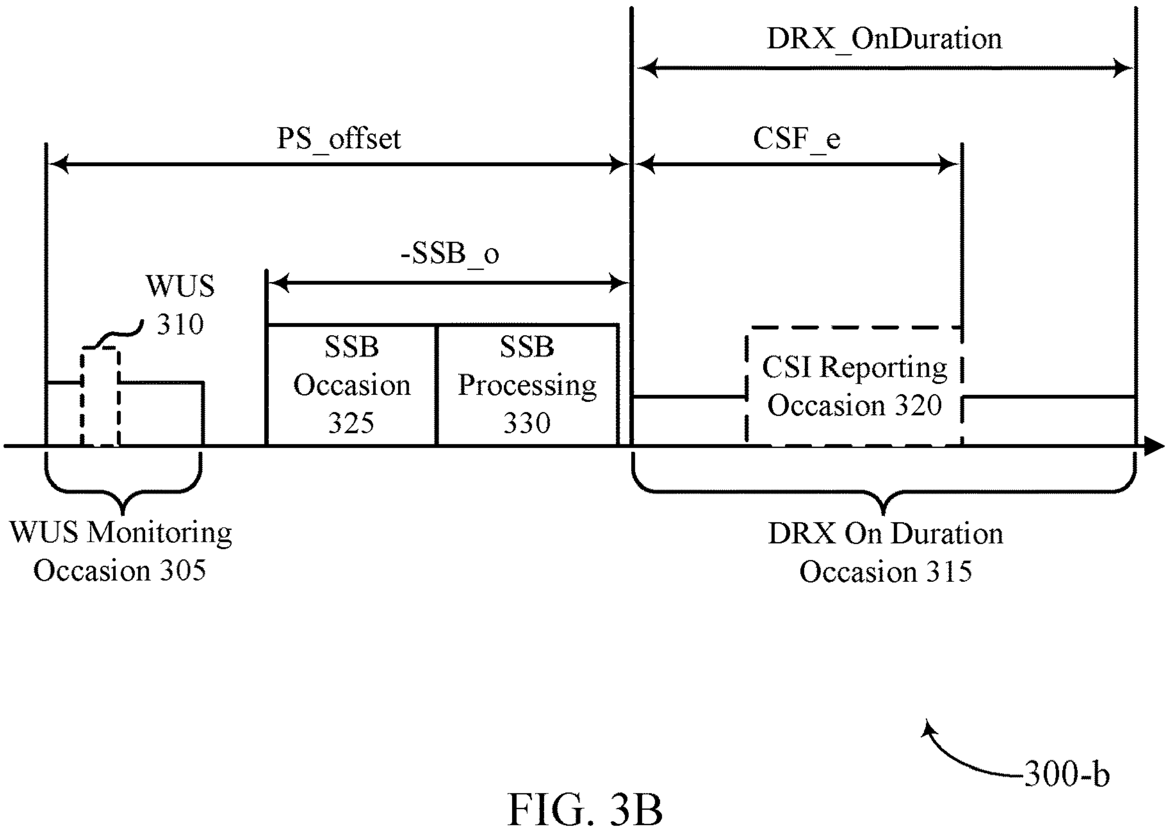

FIGS. 3A and 3B each show a respective example of a WUS evaluation procedure 300 that supports WUS monitoring framework in accordance with one or more aspects of the present disclosure. In some examples, each WUS evaluation procedure 300 may implement aspects of the wireless communications system 100 and 200. For example, WUS monitoring occasion 305, WUS 310, DRX on duration occasion 315, CSI reporting occasion 320, SSB occasion 325, and SSB processing 330 may be respective examples of signaling, occasions, and processing procedures described, with reference to FIG. 2. In some examples, each WUS evaluation procedure 300 may provide examples of the UE 115 using the WUS evaluation procedure 245 to determine whether to skip the WUS monitoring occasion 305 for a given TTI.

As described with reference to FIG. 2, the UE may determine one or more parameters based on the location of each of the occasions illustrated in FIGS. 3A and 3B. For instance, the parameter PS_offset may correspond to a duration between the start time of the WUS monitoring occasion 305 and the start time of the DRX on duration occasion 315. The parameter CSF_e may correspond to a duration between the start time of the DRX on duration occasion 315 and the end time of the CSI reporting occasion 320. The parameter SSB_o may correspond to a duration between the start time of the DRX on duration occasion 315 and the start time of the SSB occasion 325. The parameter SSB_e may correspond to a duration between the start time of the DRX on duration occasion 315 and an end time of an SSB processing 330 associated with receiving one or more SSBs during the SSB occasion 325. The parameter DRX_OnDuration corresponds to a duration between the start time and the end time of the DRX on duration occasion 315. Additionally, Max (SSB_e, DRX_OnDuration) corresponds to the larger duration between SSB_e and DRX_OnDuration, and Max (CSF_c, SSB_c) corresponds to the larger duration between SSB_e and CSF_c.

As illustrated in FIG. 3A, the start time of the SSB occasion may begin after the start time of the DRX on duration occasion 315 (e.g., SSB_o>0). As such, the WUS evaluation procedure 245 of UE 115 may operate in accordance with the techniques of WUS evaluation procedure 300-*a*. For example, the UE may determine that skipping the WUS monitoring occasion 305 may save power at the UE if Equation 1 is satisfied:

$$PS_{offset} + \max(CSF_e, SSB_e) > \max(DRX_{OnDuration}, SSB_e); \quad 1$$

$$SSB_o > 0$$

As such, if Equation 1 is satisfied, the UE may skip the WUS monitoring occasion 305. In some examples of WUS evaluation procedure 300-*a*, the UE may not be configured with an SSB occasion 325 during the TTI. In such examples, the UE may still operate in accordance with Equation 1, where SSB_e is set equal to 0. In some examples of WUS evaluation procedure 300-*a*, the UE may not be configured with CSI reporting occasion 320 during the TTI. In such examples, the UE may still operate in accordance with Equation 1, where CSF_e is set equal to 0.

As illustrated in FIG. 3B, the start time of the SSB occasion may begin prior to the start time of the DRX on duration occasion 315 (e.g., SSB_o<0). As such, the WUS evaluation procedure 245 of UE 115 may operate in accordance with the techniques of WUS evaluation procedure 300-*b*. For example, the UE may determine that skipping the WUS monitoring occasion 305 may save power at the UE if Equation 2 is satisfied:

$$PS_{offset} + CSF_e > -SSB_o + DRX_{OnDuration};$$ 2

$$SSB_o < 0$$

As such, if Equation 2 is satisfied, the UE may skip the WUS monitoring occasion 305. In some examples of WUS evaluation procedure 300-*a*, the UE may not be configured with CSI reporting occasion 320 during the TTI. In such examples, the UE may still operate in accordance with Equation 2, where CSF_e is set equal to 0.

Figure 4A:
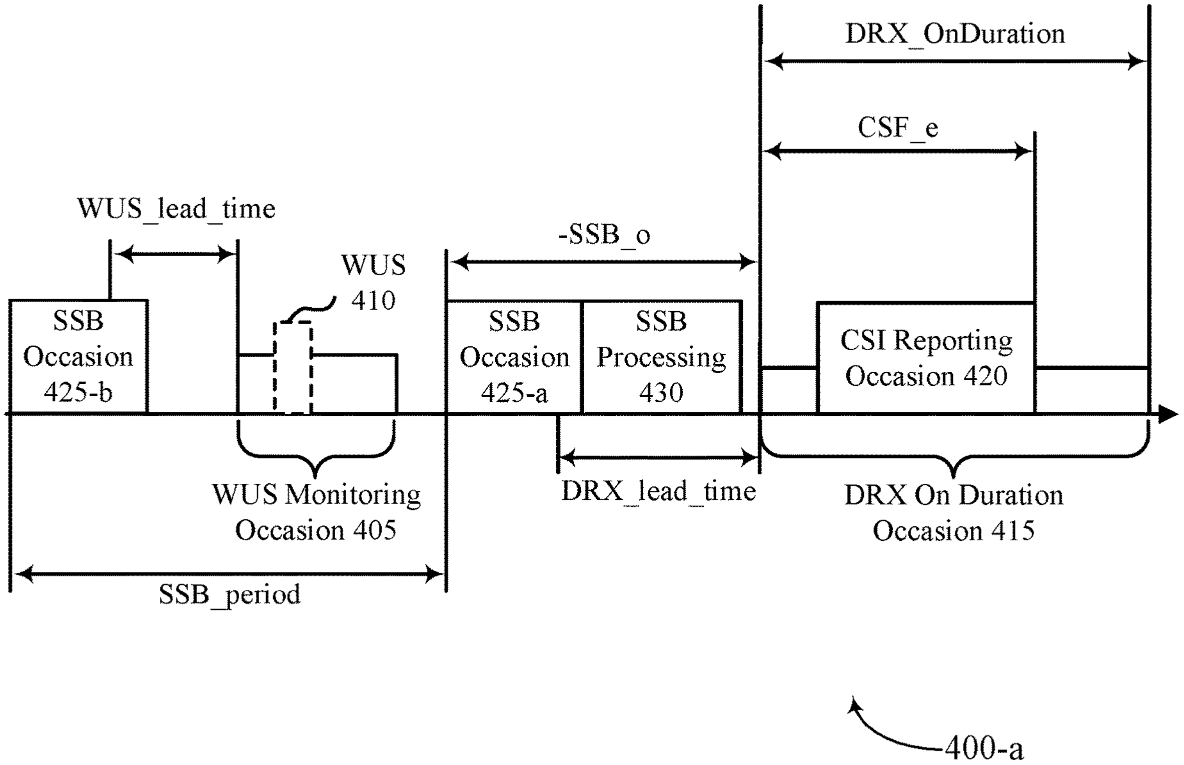
FIGS. 4A and 4B each show a respective example WUS evaluation procedure that supports WUS monitoring framework in accordance with one or more aspects of the present disclosure.
Figure 4B:
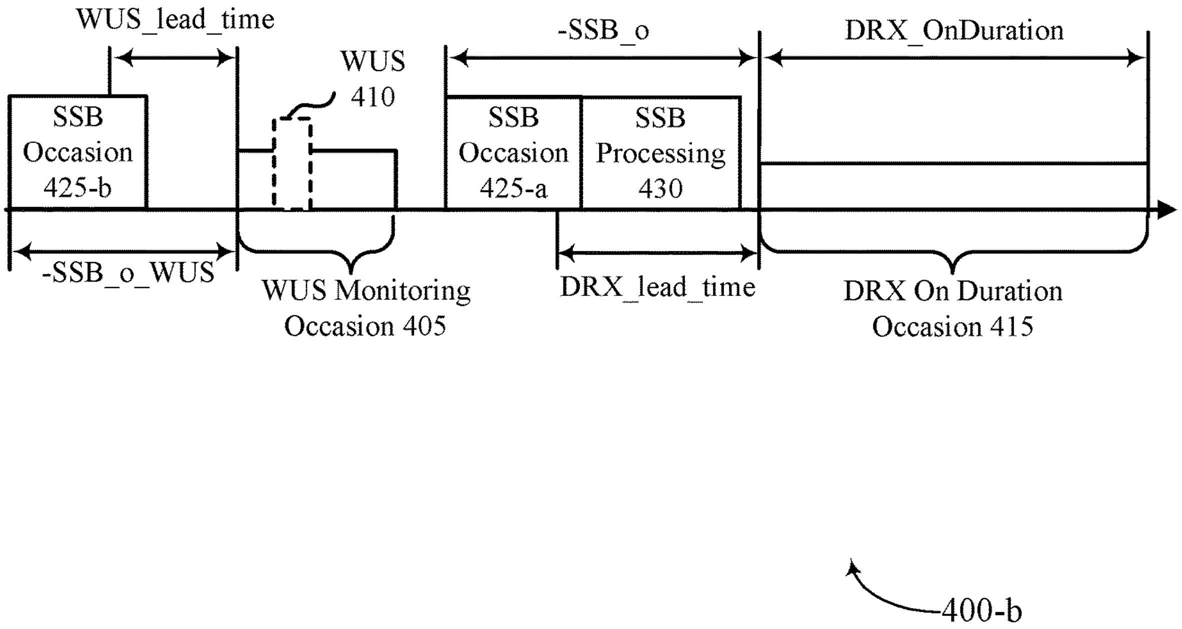

FIGS. 4A and 4B each show a respective example of a WUS evaluation procedure 400 that supports WUS monitoring framework in accordance with one or more aspects of the present disclosure. In some examples, each WUS evaluation procedure 400 may implement aspects of the wireless communications system 100 and 200. For example, WUS monitoring occasion 405, WUS 410, DRX on duration occasion 415, CSI reporting occasion 420, SSB occasion 425, and SSB processing 430 may be respective examples of signaling, occasions, and processing procedures as described with reference to FIG. 2. In some examples, each WUS evaluation procedure 400 may provide examples of the UE 115 using the WUS evaluation procedure 245 to determine whether to skip the WUS monitoring occasion 405 for a given TTI. Additionally, the UE 115 may use the techniques of FIGS. 4A and 4B if the DRX on duration occasion 415 is above a threshold (e.g., defined at the UE 115 or configured by a network entity 105 via SI or RRC signaling) and if the SSB occasion 425 occurs prior to a start time of the DRX on duration occasion 415 (e.g., SSB_o<0).

As described with reference to FIGS. 2 and 3, the UE 115 may determine one or more parameters based on the location of each of the occasions illustrated in FIGS. 4A and 4B. For instance, parameters SSB_o, CSF_e, and DRX_OnDuration may correspond to the respective durations described with reference to FIGS. 2 and 3. Additionally, FIGS. 4A and 4B may illustrate multiple periodic SSB occasions 425 during a TTI. For example, an SSB occasion 425-*a* may be configured with a start time between the WUS monitoring occasion 405 and the DRX on duration occasion 415, and an SSB occasion 425-*b* may be configured with a start time prior to the WUS monitoring occasion 405. Based on the SSB occasion 425 being periodic, the parameter SSB_period may correspond to the duration between respective start times of subsequent instances of the SSB occasion 425.

Additionally, for a UE 115 to perform PDCCH decoding during the SSB occasion 425-*b*, the UE 115 may determine whether the start time of the SSB occasion 425-*b* is prior to a lead time associated with the WUS monitoring occasion 405 (e.g., WUS_lead_time). For instance, if the start time of SSB occasion 425-*b* is prior to the start time of WUS_lead_time, then the UE 115 may use the SSB occasion 425-*b* to monitor and decode one or more SSBs. If the start time of SSB occasion 425-*b* is after the start time of WUS_lead_time, the UE 115 may refrain from monitoring during the SSB occasion 425-*b*. In some examples, the network entity 105 may configure the WUS_lead_time (e.g., via SI or RRC signaling) or the WUS_lead_time may be predefined at the UE 115.

Additionally, for the UE 115 to perform PDCCH decoding during the SSB occasion 425-*a*, the UE 115 may determine whether the start time of the SSB occasion 425-*a* is prior to a lead time associated with the DRX on duration occasion 415 (e.g., DRX_lead_time). For instance, if the start time of SSB occasion 425-*a* is prior to the start time of DRX_lead_time, then the UE 115 may determine to use the SSB occasion 425-*a* to monitor and decode one or more SSBs. If the start time of SSB occasion 425-*a* is after the start time of DRX_lead_time, the UE 115 may refrain from monitoring during the SSB occasion 425-*a*. In some examples, the network entity 105 may configure the DRX_lead_time (e.g., via SI or RRC signaling) or the DRX_lead_time may be predefined at the UE 115.

As illustrated in FIG. 4A, the associated TTI may include a CSI reporting occasion 420 during the DRX on duration occasion 415, the duration of DRX_OnDuration may be above the configured threshold, a start time of the SSB occasion 425-*a* may be prior to the DRX on duration occasion 415 (e.g., SSB_o<0), and the start time of SSB occasion 425-*a* is after the WUS_lead_time and prior to the DRX_lead_time. As such, the UE 115 may operate in accordance with the WUS evaluation procedure 400-*a*. For example, the UE 115 may determine that skipping the WUS monitoring occasion 405 may save power at the UE 115 if Equation 3 is satisfied:

$$SSB_{period} + CSF_e > DRX_{OnDuration}$$ 3

As such, if Equation 3 is satisfied, the UE 115 may skip the WUS monitoring occasion 405.

As illustrated in FIG. 4B, the associated TTI may be absent of the CSI reporting occasion 420, the duration of DRX_OnDuration may be above the configured threshold, and a start time of the SSB occasion 425-*a* may be prior to the DRX on duration occasion 415 (e.g., SSB_o<0). Additionally, the UE 115 may determine a parameter-SSB_o_WUS, which may correspond to a duration between a start time of the SSB Occasion 425-*b* and the start time of the WUS monitoring occasion 405. Additionally, the UE 115 may determine a parameter WUS_processing as a duration of time between the start time and end time of the WUS monitoring occasion 405. As such, the UE 115 may operate in accordance with the WUS evaluation procedure 400-*b*. For example, the UE 115 may determine that skipping the WUS monitoring occasion 405 may save power at the UE 115 if Equation 4 is satisfied:

$$WUS_{processing} - SSB_{o_{WUS}} > -SSB_o + DRX_{OnDuration}$$ 4

As such, if Equation 4 is satisfied, the UE 115 may skip the WUS monitoring occasion 405.

Based on whether UE 115 skips the WUS monitoring occasion 405 for WUS evaluation procedure 400-*a* and 400-*b*, the UE 115 may further determine which instance of SSB occasion 425 to monitor during. For example, if the UE 115 skips the WUS monitoring occasion 405, the UE 115 may select to monitor for the one or more SSBs during the SSB occasion 425 that is closest to the start time of the DRX on duration occasion 415 (e.g., SSB occasion 425-*a*). Alternatively, if the UE 115 determines to monitor for the WUS 410 during the WUS monitoring occasion 405, the UE 115 may determine which instance of SSB occasion 425 to monitor based on whether the CIS reporting occasion 420 is configured for the TTI. For example, with reference to FIG. 4A which includes the CSI reporting occasion 420, the UE 115 may select the SSB occasion 425 that is closest in time to both the CSI reporting occasion 420 and the WUS monitoring occasion 405 (e.g., SSB occasion 425-*a*). With reference to FIG. 4B which does not include the CSI reporting occasion 420, the UE 115 may select the SSB occasion 425 that is closest in time to the WUS monitoring occasion 405 (e.g., SSB occasion 425-*b*).

Figure 5:
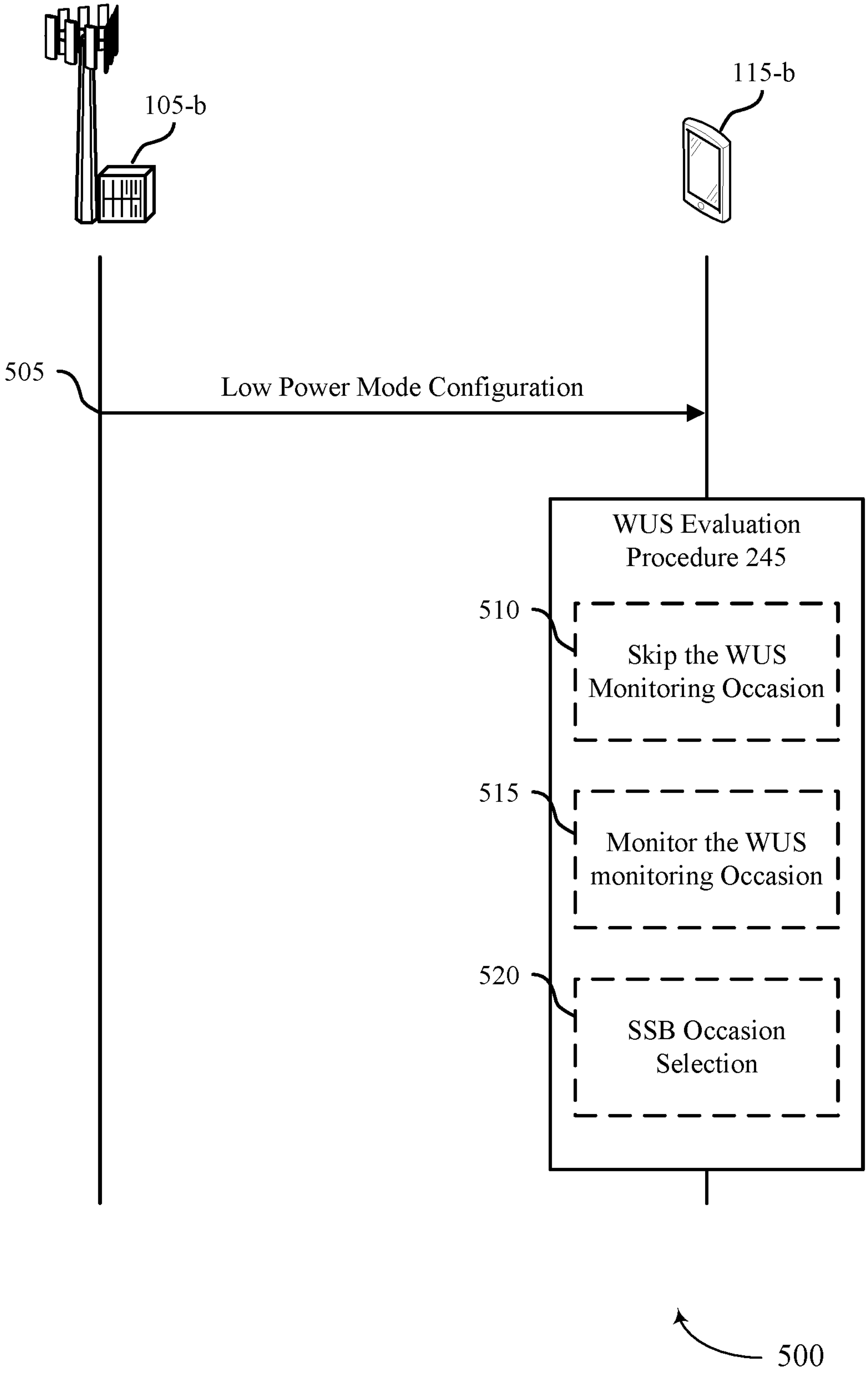
FIG. 5 shows an example of a process flow that supports WUS monitoring framework in accordance with one or more aspects of the present disclosure.

FIG. 5 shows an example of a process flow 500 that supports WUS monitoring framework in accordance with one or more aspects of the present disclosure. In some examples, process flow 500 may implement aspects of wireless communications system 100 and 200 and WUS evaluation procedure 300-*a*, 300-*b*, 400-*a*, and 400-*b*. Process flow 500 includes a UE 115-*b* and a network entity 105-*b* which may be respective examples of a UE 115 and a network entity 105, as described with reference to FIGS. 1 through 4. Alternative examples of the following may be implemented, where some steps are performed in a different order than described or are not performed at all. In some cases, steps may include additional features not mentioned below, or further steps may be added. In addition, while process flow 500 shows processes between a single UE 115 and a single network entity 105, it should be understood that these processes may occur between any quantity of network devices and network device types.

At 505, the UE 115-*b* may receive one or more control signals indicating information associated with a TTI corresponding to a low power operation mode of the UE 115-*b*. For example, the information may be associated with a set of occasions that includes a WUS monitoring occasion, one or more SSB occasions, a CSI reporting occasion, and a DRX on duration occasion. As described with reference to FIG. 2, the one or more control signals that configure the set of occasions may include one or more RRC signals, one or more SI signals, or a combination thereof. Additionally, the information included the one or more control signals may indicate a start time, duration, and periodicity for each of the set of occasions. That is, while FIG. 5 provides examples corresponding to a single TTI, the network entity 105-*b* may configure the UE 115-*b* with multiple instances of each of the set of occasions that span multiple TTIs.

Based on operating in accordance with a low power operation mode, the UE 115-*b* may determine whether to skip one or more of the set of configured occasions to decrease power expenditure at the UE 115-*b*. In some examples, the UE 115-*b* may use the WUS evaluation procedure 245 to determine whether to skip the WUS monitoring occasion. For instance, the UE 115-*b* may determine a set of durations corresponding to a respective start time and duration for each of the occasions and use the set of durations to determine whether to skip the WUS monitoring occasion.

In some examples, the UE 115-*b* may determine to operate in accordance with the techniques of FIGS. 3A and 3B. As such, the UE 115-*b* may define a first duration as PS_offset, a second duration as max (CSF_e. SSB_c), a third duration as SSB_o, and a fourth duration as max (DRX_OnDuration, SSB_c). Based on whether the SSB_o is less than or greater than 0, the UE 115-*b* may determine whether to operate in accordance with the techniques of FIG. 3A or FIG. 3B. For example, if the UE 115-*b* determines that SSB_o>0, the UE 115-*b* may use the techniques described in FIG. 3A, such that the UE 115-*b* determines whether to skip the WUS monitoring occasion in accordance with Equation 1 (e.g., skip the WUS monitoring occasion if a sum of the first duration and the second duration is greater than the fourth duration). If the UE 115-*b* determines that SSB_o<0, the UE 115-*b* may use the techniques described in FIG. 3B, such that the UE 115-*b* determines whether to skip the WUS monitoring occasion in accordance with Equation 2 (e.g., skip the WUS monitoring occasion if a sum of the first duration and the second duration is greater than a sum of the third duration and the fourth duration).

Additionally, or alternatively, the one or more control signals may indicate an absence of the SSB occasion for the TTI. As such, the UE 115-*b* may determine to set SSB_e equal to 0, in which case max (CSF_e. SSB_c) (e.g., the second duration) may equal CSF_e and max (DRX_OnDuration, SSB_c) (e.g., the fourth duration) may equal DRX_OnDuration.

In some examples, the UE 115-*b* may operate in accordance with the techniques of FIGS. 4A and 4B. For example, the one or more control signals may further indicate a set of SSB occasions Additionally, the set of SSB occasions may be associated with monitoring for a periodic transmission of one or more SSBs, a start time of a first SSB occasion of the set of SSB occasions may prior to the WUS monitoring occasion (e.g., SSB occasion 425-*b*), a start time of a second SSB occasion of the set of SSB occasions may be after the WUS monitoring occasion and prior to the DRX on duration occasion (e.g., SSB occasion 425-*a*), an SSB period may correspond to a duration of time between the start time of the first SSB occasion and the second SSB occasion (e.g., SSB_period), the WUS monitoring occasion may be associated with a first lead time that is directly prior to the WUS monitoring occasion (e.g., WUS_lead_time), and the DRX on duration occasion may be associated with a second lead time that is directly prior to the DRX on duration occasion (e.g., DRX_lead_time).

If the UE 115-*b* determines to operate in accordance with the techniques for FIG. 4A, the UE 115-*b* may define a first duration as the SSB_period, a second duration as the CSF_e, and a third duration as the DRX_OnDuration. As such, the UE 115-*b* may determine whether to skip the WUS monitoring occasion in accordance with Equation 3 (e.g., skip the WUS monitoring occasion if a sum of the first duration and the second duration is greater than the third duration). The UE 115-*b* may determine to operate in accordance with the techniques of FIG. 4A if the DRX_OnDuration is above a configured threshold, the SSB_o<0, there is a CSI reporting occasion configured for the TTI, and at least one of the SSB occasions is after the WUS_lead_time and prior to the DRX_lead_time.

If the UE 115-*b* determines to operate in accordance with the techniques for FIG. 4B, the UE 115-*b* may define a first duration as a time between the start time of the first SSB occasion and an end time of the WUS monitoring occasion and define a second duration as a time between the start time of the second SSB occasion and the end time of the DRX on duration occasion. As such, the UE 115-*b* may determine to skip in accordance with Equation 4 (e.g., skip the WUS monitoring occasion if the first duration is greater than the second duration). The UE 115-*b* may determine to operate in accordance with the techniques of FIG. 4B if the DRX_OnDuration is above a configured threshold, the SSB_o<0, and there is no CSI reporting occasion configured for the TTI.

In accordance with the WUS skipping manager 345, at 510, the UE 115-*b* may determine to skip the WUS monitoring occasion (e.g., by operating in accordance with one of Equations 1 through 4). If the TTI further includes the set of SSB occasions, then at 520 the UE 115-*b* may further perform an SSB occasion selection from the set of SSB occasions. For example, based on skipping the WUS monitoring occasion, the UE 115-*b* may monitor for the one or more SSBs during a first SSB occasion of the set of SSB occasions based on a start time of the first SSB occasion being within a duration from the DRX on duration occasion.

In accordance with the WUS skipping manager 345, at 515, the UE 115-*b* may determine to monitor the WUS monitoring occasion (e.g., by operating in accordance with one of Equations 1 through 4). If the TTI further includes the set of SSB occasions, then at 520 the UE 115-*b* may further perform an SSB occasion selection from the set of SSB occasions. For instance, if the TTI includes the CSI reporting occasion, the UE 115-*b* may monitor for one or more SSBs during a first SSB occasion of the set of SSB occasions based on a start time of the first SSB occasion being within a duration of a time window that spans the WUS monitoring occasion and the CSI reporting occasion. If the TTI is absent of the CSI reporting occasion, the UE 115-*b* may monitor for one or more SSBs during a second SSB occasion of the set of SSB occasions based on a start time of the second SSB occasion being within a duration of the start time of the WUS monitoring occasion.

Figure 6:
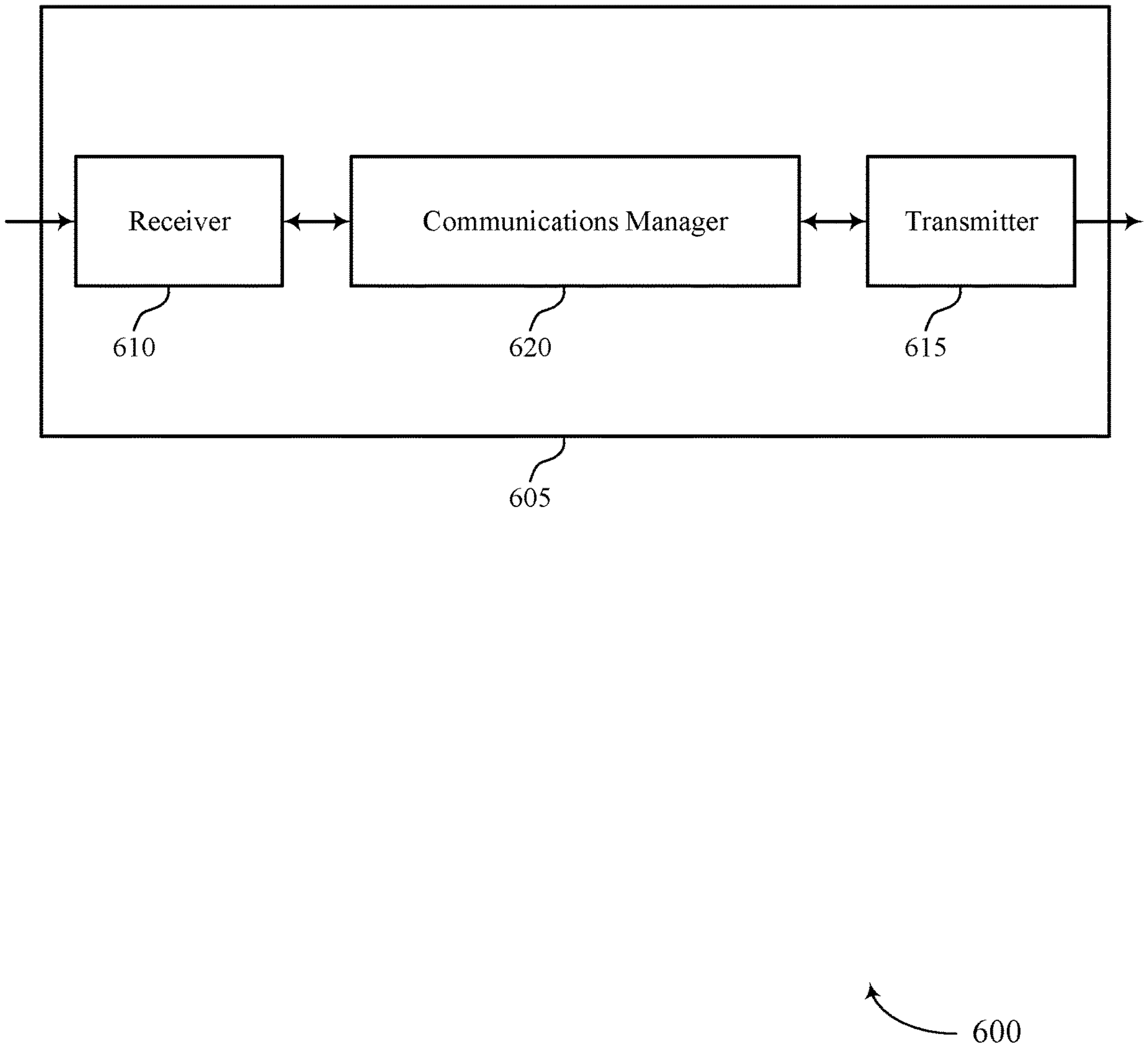
FIGS. 6 and 7 show block diagrams of devices that support WUS monitoring framework in accordance with one or more aspects of the present disclosure.

FIG. 6 shows a block diagram 600 of a device 605 that supports WUS monitoring framework in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to WUS monitoring framework). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to WUS monitoring framework). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of WUS monitoring framework as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving one or more control signals indicating information associated with a set of occasions for a TTI corresponding to a low power operation mode of the UE, the set of occasions including a WUS monitoring occasion, a SSB occasion, a CSI reporting occasion, and a DRX on duration occasion. The communications manager 620 is capable of, configured to, or operable to support a means for determining whether to skip the WUS monitoring occasion based on a respective duration and a respective start time for each occasion of the set of occasions associated with the information indicated by the one or more control signals.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and a more efficient utilization of communication resources.

Figure 7:
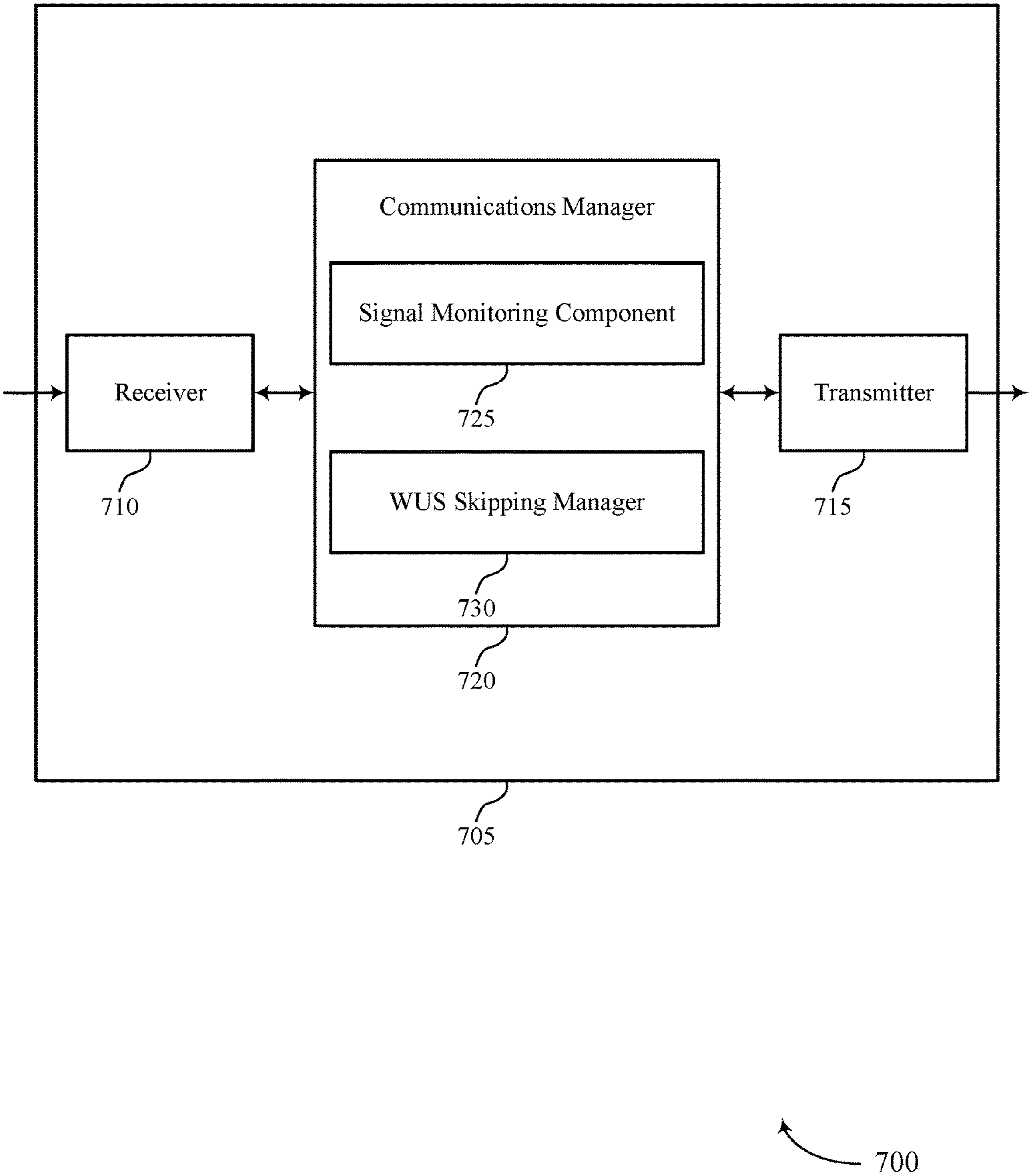

FIG. 7 shows a block diagram 700 of a device 705 that supports WUS monitoring framework in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to WUS monitoring framework). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to WUS monitoring framework). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of WUS monitoring framework as described herein. For example, the communications manager 720 may include a signal monitoring component 725 a WUS Skipping Manager 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The signal monitoring component 725 is capable of, configured to, or operable to support a means for receiving one or more control signals indicating information associated with a set of occasions for a TTI corresponding to a low power operation mode of the UE, the set of occasions including a WUS monitoring occasion, a SSB occasion, a CSI reporting occasion, and a DRX on duration occasion. The WUS Skipping Manager 730 is capable of, configured to, or operable to support a means for determining whether to skip the WUS monitoring occasion based on a respective duration and a respective start time for each occasion of the set of occasions associated with the information indicated by the one or more control signals.

Figure 8:
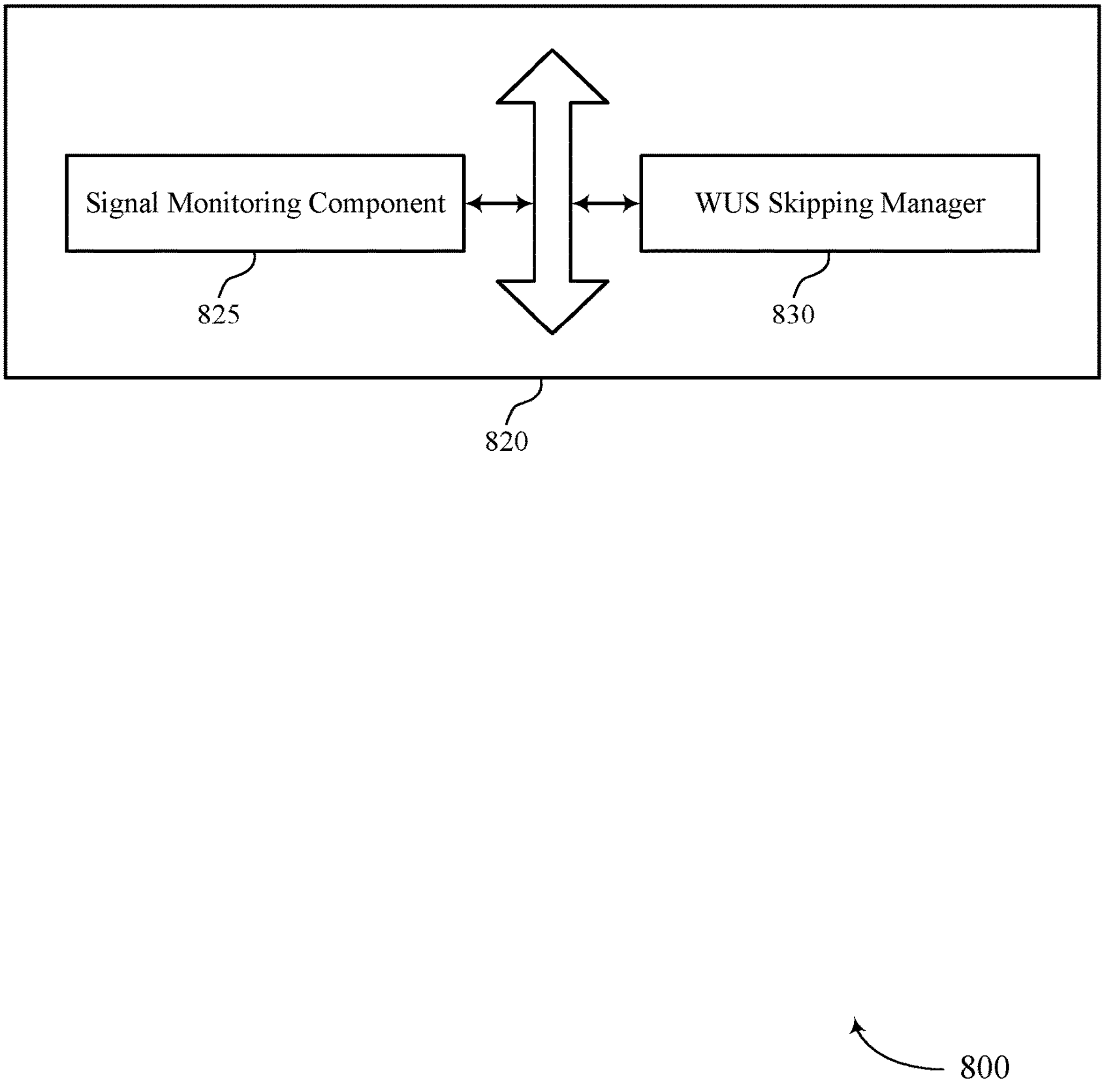
FIG. 8 shows a block diagram of a communications manager that supports WUS monitoring framework in accordance with one or more aspects of the present disclosure.

FIG. 8 shows a block diagram 800 of a communications manager 820 that supports WUS monitoring framework in accordance with one or more aspects of the present disclosure. The communications manager 820 may be an example of aspects of a communications manager 620, a communications manager 720, or both, as described herein. The communications manager 820, or various components thereof, may be an example of means for performing various aspects of WUS monitoring framework as described herein. For example, the communications manager 820 may include a signal monitoring component 825 a WUS Skipping Manager 830, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The signal monitoring component 825 is capable of, configured to, or operable to support a means for receiving one or more control signals indicating information associated with a set of occasions for a TTI corresponding to a low power operation mode of the UE, the set of occasions including a WUS monitoring occasion, a SSB occasion, a CSI reporting occasion, and a DRX on duration occasion. The WUS Skipping Manager 830 is capable of, configured to, or operable to support a means for determining whether to skip the WUS monitoring occasion based on a respective duration and a respective start time for each occasion of the set of occasions associated with the information indicated by the one or more control signals.

In some examples, a first duration corresponds to a time between a start time of the WUS monitoring occasion and a start time of the DRX on duration occasion; a second duration corresponds to a time between the start time of the DRX on duration occasion and an end time for one of the CSI reporting occasion or a processing time of one or more SSBs received during the SSB occasion; a third duration corresponds to a time between a start time of the SSB occasion and the start time of the DRX on duration occasion; and a fourth duration corresponds to a time between the start time of the DRX on duration occasion and an end time for one of the DRX on duration occasion or the processing time of the one or more SSBs received during the SSB occasion.

In some examples, to support determining whether to skip the WUS monitoring occasion, the WUS Skipping Manager 830 is capable of, configured to, or operable to support a means for skipping the WUS monitoring occasion based on a sum of the first duration and the second duration being greater than the fourth duration.

In some examples, a start time of the SSB occasion is after the start time of the DRX on duration occasion.

In some examples, to support receiving the one or more control signals, the signal monitoring component 825 is capable of, configured to, or operable to support a means for receiving the one or more control signals indicating the information associated with the set of occasions, where the information indicates an absence of the SSB occasion for the TTI, and where, based on the absence of the SSB occasion for the TTI: the second duration corresponds to a time between the start time of the DRX on duration occasion and the end time of the CSI reporting occasion; and the fourth duration corresponds to a time between the start time of the DRX on duration occasion and the end time of the DRX on duration occasion.

In some examples, to support determining whether to skip the WUS monitoring occasion, the WUS Skipping Manager 830 is capable of, configured to, or operable to support a means for skipping the WUS monitoring occasion based on a first sum of the first duration and the second duration being greater than a second sum of the third duration and the fourth duration.

In some examples, the start time of the SSB occasion is prior to the start time of the DRX on duration occasion.

In some examples, to support determining whether to skip the WUS monitoring occasion, the signal monitoring component 825 is capable of, configured to, or operable to support a means for monitoring during the WUS monitoring occasion, where the one or more control signals further indicate a set of SSB occasions that includes the SSB occasion, the set of SSB occasions associated with monitoring for periodic transmission of one or more SSBs. In some examples, to support determining whether to skip the WUS monitoring occasion, the signal monitoring component 825 is capable of, configured to, or operable to support a means for monitoring for the one or more SSBs during a first SSB occasion of the set of SSB occasions based on a start time of the first SSB occasion being within a duration of a time window that spans the WUS monitoring occasion and the CSI reporting occasion.

In some examples, the information of the one or more control signals indicates an absence of the CSI reporting occasion for the TTI. In some examples, the time window spans the WUS monitoring occasion based at least in part on the absence of the CSI reporting occasion.

In some examples, to support determining whether to skip the WUS monitoring occasion, the WUS Skipping Manager 830 is capable of, configured to, or operable to support a means for skipping the WUS monitoring occasion, where the one or more control signals further indicate a set of SSB occasions that includes the SSB occasion, the set of SSB occasions associated with monitoring for periodic transmission of one or more SSBs. In some examples, to support determining whether to skip the WUS monitoring occasion, the signal monitoring component 825 is capable of, configured to, or operable to support a means for monitoring for the one or more SSBs during a first SSB occasion of the set of SSB occasions based on a start time of the first SSB occasion being within a duration from the DRX on duration occasion.

In some examples, the one or more control signals further indicate a set of SSB occasions that includes the SSB occasion; the set of SSB occasions are associated with monitoring for a periodic transmission of one or more SSBs; a start time of a first SSB occasion of the set of SSB occasions is prior to the WUS monitoring occasion; a start time of a second SSB occasion of the set of SSB occasions is after the WUS monitoring occasion and prior to the DRX on duration occasion; an SSB period corresponds to a duration of time between the start time of the first SSB occasion and the second SSB occasion; the WUS monitoring occasion is associated with a first lead time that is directly prior to the WUS monitoring occasion; and the DRX on duration occasion is associated with a second lead time that is directly prior to the DRX on duration occasion.

In some examples, a first duration corresponds to the SSB period between the start time of the first SSB occasion and the second SSB occasion; a second duration corresponds to a time between a start time of the DRX on duration occasion and an end time of the CSI reporting occasion; a third duration corresponds a time between the start time of the DRX on duration occasion and an end time of the DRX on duration occasion and, to support determining whether to skip the WUS monitoring occasion, the WUS Skipping Manager 830 is capable of, configured to, or operable to support a means for skipping the WUS monitoring occasion based on a sum of the first duration and the second duration being greater than the third duration and on the second SSB occasion being after the first lead time and before the second lead time.

In some examples, the information of the one or more control signals indicates an absence of the CSI reporting occasion for the TTI; a first duration corresponds to a time between the start time of the first SSB occasion and an end time of the WUS monitoring occasion; a second duration corresponds to a time between the start time of the second SSB occasion and the end time of the DRX on duration occasion and, to support determining whether to skip the WUS monitoring occasion, the WUS Skipping Manager 830 is capable of, configured to, or operable to support a means for skipping the WUS monitoring occasions based on the first duration being greater than the second duration.

In some examples, the one or more control signals include one or more radio resource control signals, one or more system information signals, or a combination thereof.

In some examples, the signal monitoring component 825 is capable of, configured to, or operable to support a means for receiving, a radio resource control message that indicates for the UE to transmit a CSI report or a reference signal received power report regardless of starting a timer associated with the DRX on duration occasion, and indicates for the UE to refrain from waking up during the TTI if the UE does not receive a WUS during the WUS monitoring occasion. In some examples, the WUS Skipping Manager 830 is capable of, configured to, or operable to support a means for disabling a procedure to determine whether to skip the WUS monitoring occasion based on the radio resource control message and the CSI reporting occasion being within the DRX on duration occasion.

In some examples, the signal monitoring component 825 is capable of, configured to, or operable to support a means for transmitting an unsolicited CSI report or an unsolicited reference signal received power report based on disabling the procedure to determine whether to skip the WUS monitoring occasion.

Figure 9:
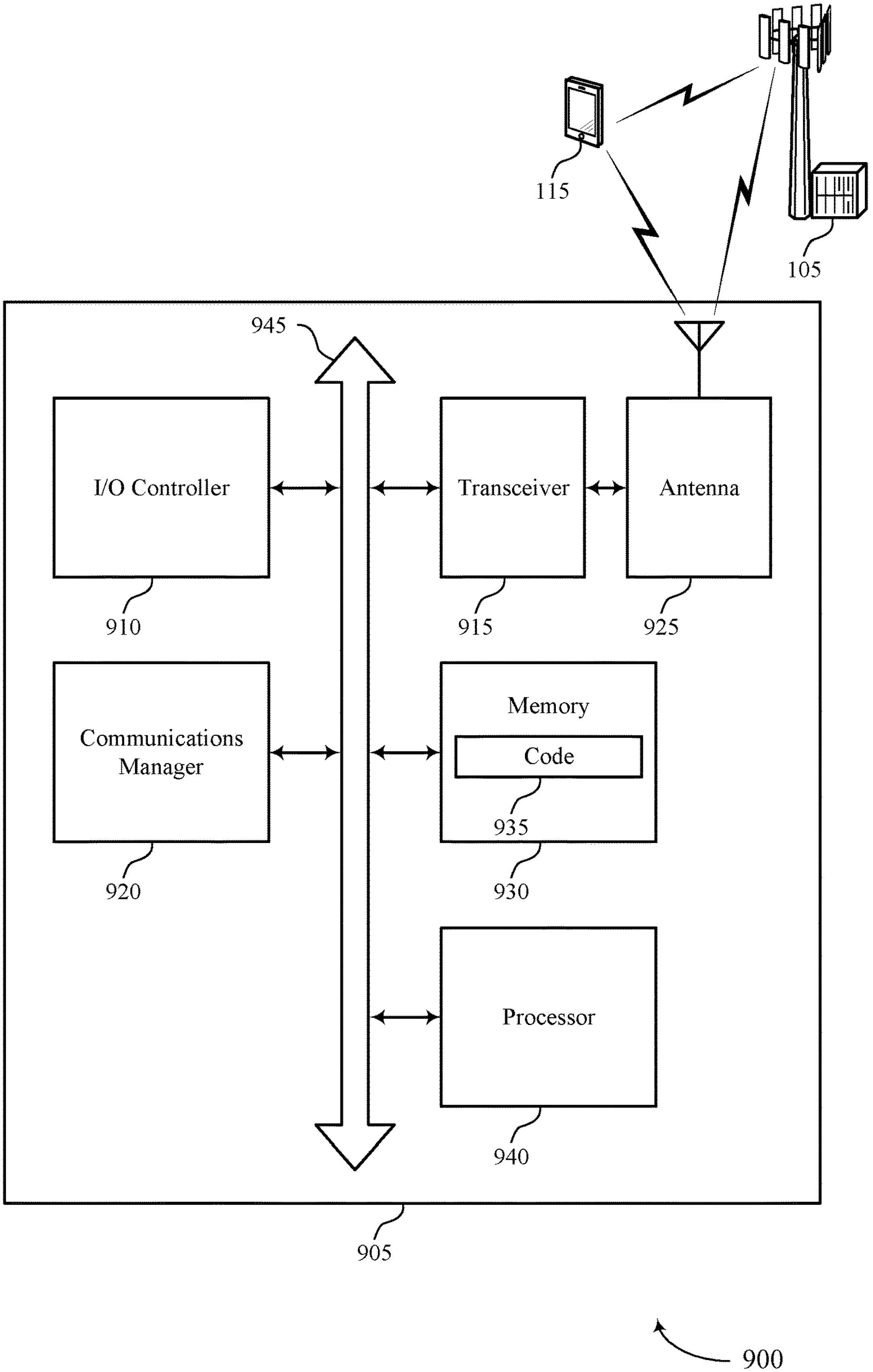
FIG. 9 shows a diagram of a system including a device that supports WUS monitoring framework in accordance with one or more aspects of the present disclosure.

FIG. 9 shows a diagram of a system 900 including a device 905 that supports WUS monitoring framework in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting WUS monitoring framework). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving one or more control signals indicating information associated with a set of occasions for a TTI corresponding to a low power operation mode of the UE, the set of occasions including a WUS monitoring occasion, a SSB occasion, a CSI reporting occasion, and a DRX on duration occasion. The communications manager 920 is capable of, configured to, or operable to support a means for determining whether to skip the WUS monitoring occasion based on a respective duration and a respective start time for each occasion of the set of occasions associated with the information indicated by the one or more control signals.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of WUS monitoring framework as described herein, or the at least one processor 940 and the at least one memory 930 may be otherwise configured to, individually or collectively, perform or support such operations.

Figure 10:
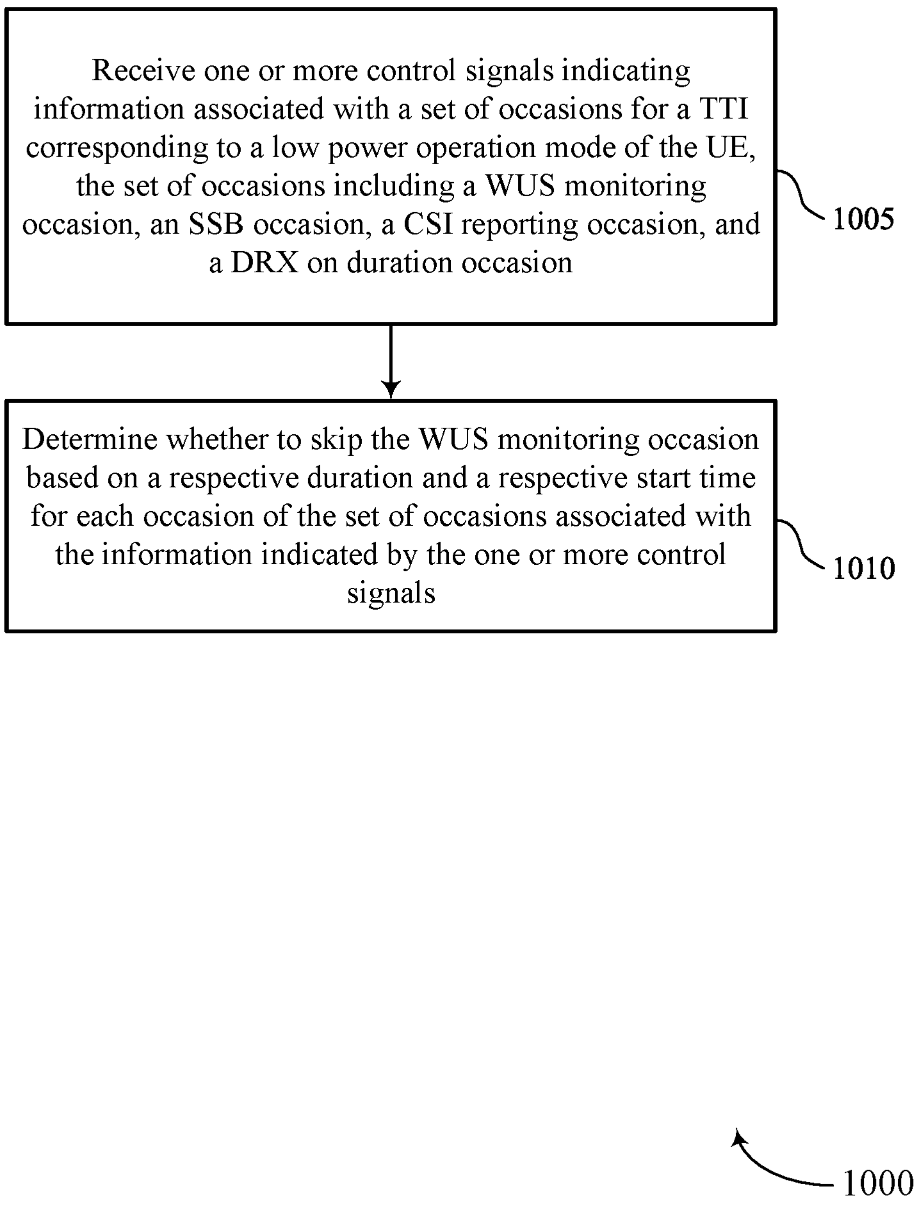
FIGS. 10 and 11 show flowcharts illustrating methods that support WUS monitoring framework in accordance with one or more aspects of the present disclosure.

FIG. 10 shows a flowchart illustrating a method 1000 that supports WUS monitoring framework in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving one or more control signals indicating information associated with a set of occasions for a TTI corresponding to a low power operation mode of the UE, the set of occasions including a WUS monitoring occasion, a SSB occasion, a CSI reporting occasion, and a DRX on duration occasion. The operations of block 1005 may be performed in accordance with examples as disclosed herein. In some examples, aspects of the operations of 1005 may be performed by a signal monitoring component 825 as described with reference to FIG. 8.

At 1010, the method may include determining whether to skip the WUS monitoring occasion based on a respective duration and a respective start time for each occasion of the set of occasions associated with the information indicated by the one or more control signals. The operations of block 1010 may be performed in accordance with examples as disclosed herein. In some examples, aspects of the operations of 1010 may be performed by a WUS Skipping Manager 830 as described with reference to FIG. 8.

Figure 11:
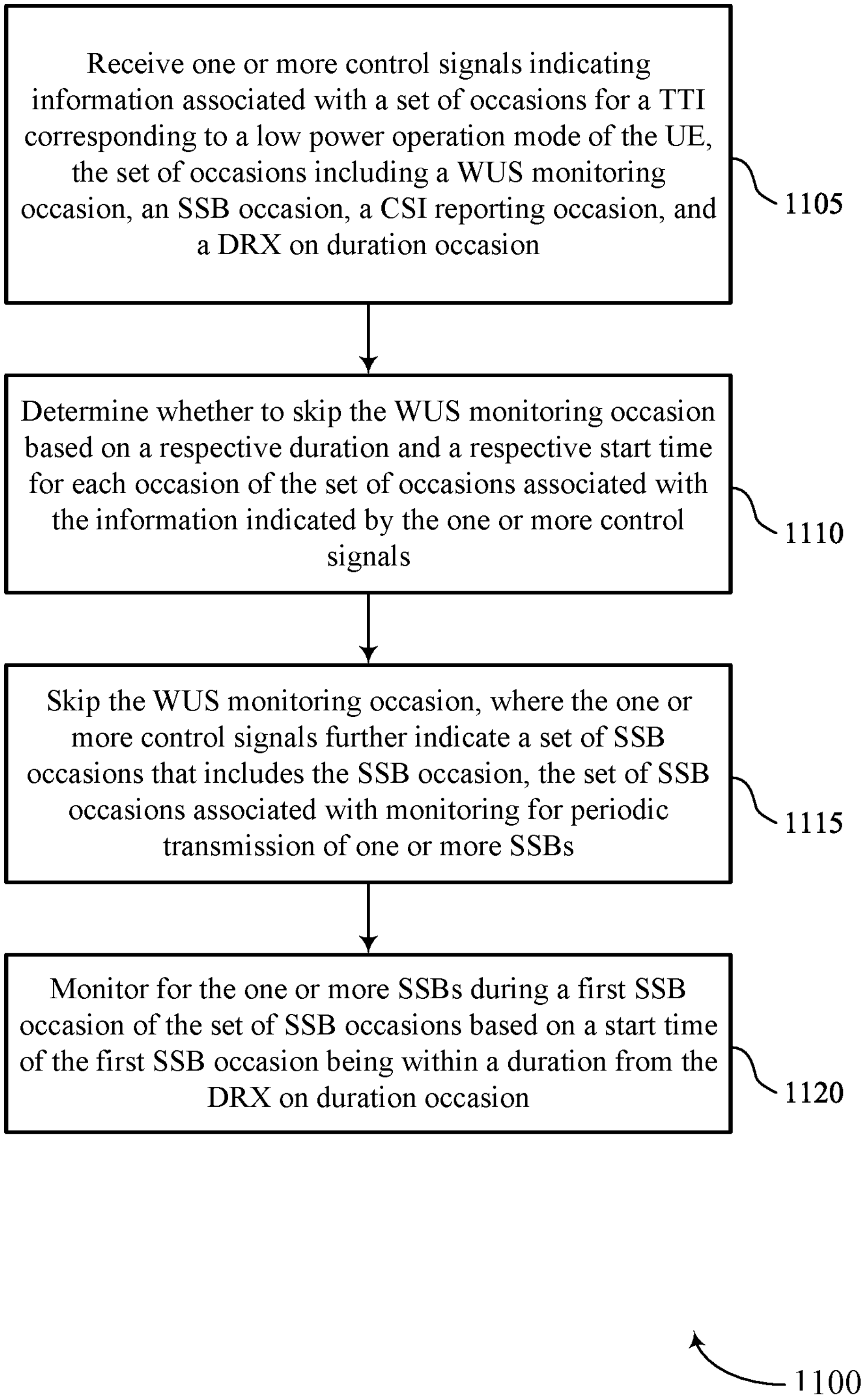

FIG. 11 shows a flowchart illustrating a method 1100 that supports WUS monitoring framework in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving one or more control signals indicating information associated with a set of occasions for a TTI corresponding to a low power operation mode of the UE, the set of occasions including a WUS monitoring occasion, a SSB occasion, a CSI reporting occasion, and a DRX on duration occasion. The operations of block 1105 may be performed in accordance with examples as disclosed herein. In some examples, aspects of the operations of 1105 may be performed by a signal monitoring component 825 as described with reference to FIG. 8.

At 1110, the method may include determining whether to skip the WUS monitoring occasion based on a respective duration and a respective start time for each occasion of the set of occasions associated with the information indicated by the one or more control signals. The operations of block 1110 may be performed in accordance with examples as disclosed herein. In some examples, aspects of the operations of 1110 may be performed by a WUS Skipping Manager 830 as described with reference to FIG. 8.

At 1115, the method may include skipping the WUS monitoring occasion, where the one or more control signals further indicate a set of SSB occasions that includes the SSB occasion, the set of SSB occasions associated with monitoring for periodic transmission of one or more SSBs. The operations of block 1115 may be performed in accordance with examples as disclosed herein. In some examples, aspects of the operations of 1115 may be performed by a WUS Skipping Manager 830 as described with reference to FIG. 8.

At 1120, the method may include monitoring for the one or more SSBs during a first SSB occasion of the set of SSB occasions based on a start time of the first SSB occasion being within a duration from the DRX on duration occasion. The operations of block 1120 may be performed in accordance with examples as disclosed herein. In some examples, aspects of the operations of 1120 may be performed by a signal monitoring component 825 as described with reference to FIG. 8.

The following provides an overview of aspects of the present disclosure:

Aspect 1: A method for wireless communications at a UE, comprising: receiving one or more control signals indicating information associated with a set of occasions for a TTI corresponding to a low power operation mode of the UE, the set of occasions comprising a WUS monitoring occasion, a SSB occasion, a CSI reporting occasion, and a DRX on duration occasion; and determining whether to skip the WUS monitoring occasion based at least in part on a respective duration and a respective start time for each occasion of the set of occasions associated with the information indicated by the one or more control signals.

Aspect 2: The method of aspect 1, wherein a first duration corresponds to a time between a start time of the WUS monitoring occasion and a start time of the DRX on duration occasion; a second duration corresponds to a time between the start time of the DRX on duration occasion and an end time for one of the CSI reporting occasion or a processing time of one or more SSBs received during the SSB occasion; a third duration corresponds to a time between a start time of the SSB occasion and the start time of the DRX on duration occasion; and a fourth duration corresponds to a time between the start time of the DRX on duration occasion and an end time for one of the DRX on duration occasion or the processing time of the one or more SSBs received during the SSB occasion.

Aspect 3: The method of aspect 2, wherein determining whether to skip the WUS monitoring occasion comprises: skipping the WUS monitoring occasion based at least in part on a sum of the first duration and the second duration being greater than the fourth duration.

Aspect 4: The method of aspect 3, wherein a start time of the SSB occasion is after the start time of the DRX on duration occasion.

Aspect 5: The method of any of aspects 3 through 4, wherein receiving the one or more control signals comprises: receiving the one or more control signals indicating the information associated with the set of occasions, wherein the information indicates an absence of the SSB occasion for the TTI, and wherein, based at least in part on the absence of the SSB occasion for the TTI: the second duration corresponds to a time between the start time of the DRX on duration occasion and the end time of the CSI reporting occasion; and the fourth duration corresponds to a time between the start time of the DRX on duration occasion and the end time of the DRX on duration occasion.

Aspect 6: The method of any of aspects 2 through 5, wherein determining whether to skip the WUS monitoring occasion comprises: skipping the WUS monitoring occasion based at least in part on a first sum of the first duration and the second duration being greater than a second sum of the third duration and the fourth duration.

Aspect 7: The method of aspect 6, wherein the start time of the SSB occasion is prior to the start time of the DRX on duration occasion.

Aspect 8: The method of any of aspects 1 through 7, wherein determining whether to skip the WUS monitoring occasion comprises: monitoring during the WUS monitoring occasion, wherein the one or more control signals further indicate a set of SSB occasions that comprises the SSB occasion, the set of SSB occasions associated with monitoring for periodic transmission of one or more SSBs; and monitoring for the one or more SSBs during a first SSB occasion of the set of SSB occasions based at least in part on a start time of the first SSB occasion being within a duration of a time window that spans the WUS monitoring occasion and the CSI reporting occasion.

Aspect 9: The method of aspect 8, wherein the information of the one or more control signals indicates an absence of the CSI reporting occasion for the TTI, and the time window spans the WUS monitoring occasion based at least in part the absence of the CSI reporting occasion.

Aspect 10: The method of any of aspects 1 through 9, wherein determining whether to skip the WUS monitoring occasion comprises: skipping the WUS monitoring occasion, wherein the one or more control signals further indicate a set of SSB occasions that comprises the SSB occasion, the set of SSB occasions associated with monitoring for periodic transmission of one or more SSBs; and monitoring for the one or more SSBs during a first SSB occasion of the set of SSB occasions based at least in part on a start time of the first SSB occasion being within a duration from the DRX on duration occasion.

Aspect 11: The method of any of aspects 1 through 10, wherein the one or more control signals further indicate a set of SSB occasions that comprises the SSB occasion; the set of SSB occasions are associated with monitoring for a periodic transmission of one or more SSBs; a start time of a first SSB occasion of the set of SSB occasions is prior to the WUS monitoring occasion; a start time of a second SSB occasion of the set of SSB occasions is after the WUS monitoring occasion and prior to the DRX on duration occasion; an SSB period corresponds to a duration of time between the start time of the first SSB occasion and the second SSB occasion; the WUS monitoring occasion is associated with a first lead time that is directly prior to the WUS monitoring occasion; and the DRX on duration occasion is associated with a second lead time that is directly prior to the DRX on duration occasion.

Aspect 12: The method of aspect 11, wherein a first duration corresponds to the SSB period between the start time of the first SSB occasion and the second SSB occasion; a second duration corresponds to a time between a start time of the DRX on duration occasion and an end time of the CSI reporting occasion; a third duration corresponds a time between the start time of the DRX on duration occasion and an end time of the DRX on duration occasion; and determining whether to skip the WUS monitoring occasion comprises: skipping the WUS monitoring occasion based at least in part on a sum of the first duration and the second duration being greater than the third duration and on the second SSB occasion being after the first lead time and before the second lead time.

Aspect 13: The method of any of aspects 11 through 12, wherein the information of the one or more control signals indicates an absence of the CSI reporting occasion for the TTI; a first duration corresponds to a time between the start time of the first SSB occasion and an end time of the WUS monitoring occasion; a second duration corresponds to a time between the start time of the second SSB occasion and the end time of the DRX on duration occasion; and determining whether to skip the WUS monitoring occasion comprises: skipping the WUS monitoring occasions based at least in part on the first duration being greater than the second duration.

Aspect 14: The method of any of aspects 1 through 13, wherein the one or more control signals comprise one or more radio resource control signals, one or more system information signals, or a combination thereof.

Aspect 15: The method of any of aspects 1 through 14, further comprising: receiving, a radio resource control message that indicates for the UE to transmit a CSI report or a reference signal received power report regardless of starting a timer associated with the DRX on duration occasion, and indicates for the UE to refrain from waking up during the TTI if the UE does not receive a WUS during the WUS monitoring occasion; and disabling a procedure to determine whether to skip the WUS monitoring occasion based at least in part on the radio resource control message and the CSI reporting occasion being within the DRX on duration occasion.

Aspect 16: The method of aspect 15, further comprising: transmitting an unsolicited CSI report or an unsolicited reference signal received power report based at least in part on disabling the procedure to determine whether to skip the WUS monitoring occasion.

Aspect 17: A UE for wireless communications, comprising one or more memories storing processor-executable code, and one or more processors coupled with the one or more memories and individually or collectively operable to execute the code to cause the UE to perform a method of any of aspects 1 through 16.

Aspect 18: A UE for wireless communications, comprising at least one means for performing a method of any of aspects 1 through 16.

Aspect 19: A non-transitory computer-readable medium storing code for wireless communications, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive one or more control signals indicating information associated with a set of occasions for a transmission time interval (TTI) corresponding to a low power operation mode of the UE, the set of occasions comprising a wake up signal (WUS) monitoring occasion, a synchronization signal block (SSB) occasion, a channel state information (CSI) reporting occasion, and a discontinuous reception (DRX) on duration occasion; and determine whether to skip the WUS monitoring occasion based at least in part on a respective duration and a respective start time for each occasion of the set of occasions associated with the information indicated by the one or more control signals, wherein a first duration corresponds to a time between a start time of the WUS monitoring occasion and a start time of the DRX on duration occasion; a second duration corresponds to a time between the start time of the DRX on duration occasion and an end time for one of the CSI reporting occasion or a processing time of one or more SSBs received during the SSB occasion and a fourth duration corresponds to a time between the start time of the DRX on duration occasion and an end time for one of the DRX on duration occasion or the processing time of the one or more SSBs received during the SSB occasion;

wherein to determine whether to skip the WUS monitoring occasion, the one or more processors are individually or collectively operable to execute the code to cause the UE to skip the WUS monitoring occasion based at least in part on a sum of the first duration and the second duration being greater than the fourth duration.

2. The UE of claim 1, wherein:

a third duration corresponds to a time between a start time of the SSB occasion and the start time of the DRX on duration occasion.

3. The UE of claim 2, wherein, to determine whether to skip the WUS monitoring occasion, the one or more processors are individually or collectively operable to execute the code to cause the UE to:

skip the WUS monitoring occasion based at least in part on a first sum of the first duration and the second duration being greater than a second sum of the third duration and the fourth duration.

4. The UE of claim 3, wherein the start time of the SSB occasion is prior to the start time of the DRX on duration occasion.

5. The UE of claim 1, wherein the start time of the SSB occasion is after the start time of the DRX on duration occasion.

6. The UE of claim 1, wherein, to receive the one or more control signals, the one or more processors are individually or collectively operable to execute the code to cause the UE to:

receive the one or more control signals indicating the information associated with the set of occasions, wherein the information indicates an absence of the SSB occasion for the TTI, and wherein, based at least in part on the absence of the SSB occasion for the TTI:

the second duration corresponds to a time between the start time of the DRX on duration occasion and the end time of the CSI reporting occasion; and the fourth duration corresponds to a time between the start time of the DRX on duration occasion and the end time of the DRX on duration occasion.

7. The UE of claim 1, wherein, to determine whether to skip the WUS monitoring occasion, the one or more processors are individually or collectively operable to execute the code to cause the UE to:

monitor during the WUS monitoring occasion, wherein the one or more control signals further indicate a set of SSB occasions that comprises the SSB occasion, the set of SSB occasions associated with monitoring for periodic transmission of one or more SSBs; and monitor for the one or more SSBs during a first SSB occasion of the set of SSB occasions based at least in part on a start time of the first SSB occasion being within a duration of a time window that spans the WUS monitoring occasion and the CSI reporting occasion.

8. The UE of claim 7, wherein the information of the one or more control signals indicates an absence of the CSI reporting occasion for the TTI, and wherein the time window spans the WUS monitoring occasion based at least in part on the absence of the CSI reporting occasion.

9. The UE of claim 1, wherein, to determine whether to skip the WUS monitoring occasion, the one or more processors are individually or collectively operable to execute the code to cause the UE to:

skip the WUS monitoring occasion, wherein the one or more control signals further indicate a set of SSB occasions that comprises the SSB occasion, the set of SSB occasions associated with monitoring for periodic transmission of one or more SSBs; and monitor for the one or more SSBs during a first SSB occasion of the set of SSB occasions based at least in part on a start time of the first SSB occasion being within a duration from the DRX on duration occasion.

10. The UE of claim 1, wherein:

the one or more control signals further indicate a set of SSB occasions that comprises the SSB occasion;

the set of SSB occasions are associated with monitoring for a periodic transmission of one or more SSBs;

a start time of a first SSB occasion of the set of SSB occasions is prior to the WUS monitoring occasion;

a start time of a second SSB occasion of the set of SSB occasions is after the WUS monitoring occasion and prior to the DRX on duration occasion;

an SSB period corresponds to a duration of time between the start time of the first SSB occasion and the second SSB occasion;

the WUS monitoring occasion is associated with a first lead time that is directly prior to the WUS monitoring occasion; and the DRX on duration occasion is associated with a second lead time that is directly prior to the DRX on duration occasion.

11. The UE of claim 10, wherein:

a first duration corresponds to the SSB period between the start time of the first SSB occasion and the second SSB occasion;

a second duration corresponds to a time between a start time of the DRX on duration occasion and an end time of the CSI reporting occasion;

a third duration corresponds a time between the start time of the DRX on duration occasion and an end time of the DRX on duration occasion; and to determine whether to skip the WUS monitoring occasion, the one or more processors are individually or collectively operable to execute the code to cause the UE to:

skip the WUS monitoring occasion based at least in part on a sum of the first duration and the second duration being greater than the third duration and on the second SSB occasion being after the first lead time and before the second lead time.

12. The UE of claim 10, wherein:

the information of the one or more control signals indicates an absence of the CSI reporting occasion for the TTI;

a first duration corresponds to a time between the start time of the first SSB occasion and an end time of the WUS monitoring occasion;

a second duration corresponds to a time between the start time of the second SSB occasion and the end time of the DRX on duration occasion; and to determine whether to skip the WUS monitoring occasion, the one or more processors are individually or collectively operable to execute the code to cause the UE to:

skip the WUS monitoring occasions based at least in part on the first duration being greater than the second duration.

13. The UE of claim 1, wherein the one or more control signals comprise one or more radio resource control signals, one or more system information signals, or a combination thereof.

14. The UE of claim 1, wherein the one or more processors are individually or collectively operable to execute the code to cause the UE to:

receive, a radio resource control message that indicates for the UE to transmit a CSI report or a reference signal received power report regardless of starting a timer associated with the DRX on duration occasion, and indicates for the UE to refrain from waking up during the TTI if the UE does not receive a WUS during the WUS monitoring occasion; and disable a procedure to determine whether to skip the WUS monitoring occasion based at least in part on the radio resource control message and the CSI reporting occasion being within the DRX on duration occasion.

15. The UE of claim 14, wherein the one or more processors are individually or collectively operable to execute the code to cause the UE to:

transmit an unsolicited CSI report or an unsolicited reference signal received power report based at least in part on disabling the procedure to determine whether to skip the WUS monitoring occasion.

16. A method for wireless communications at a user equipment (UE), comprising:

receiving one or more control signals indicating information associated with a set of occasions for a transmission time interval (TTI) corresponding to a low power operation mode of the UE, the set of occasions comprising a wake up signal (WUS) monitoring occasion, a synchronization signal block (SSB) occasion, a channel state information (CSI) reporting occasion, and a discontinuous reception (DRX) on duration occasion; and determining whether to skip the WUS monitoring occasion based at least in part on a respective duration and a respective start time for each occasion of the set of occasions associated with the information indicated by the one or more control signals, wherein a first duration corresponds to a time between a start time of the WUS monitoring occasion and a start time of the DRX on duration occasion, a second duration corresponds to a time between the start time of the DRX on duration occasion and an end time for one of the CSI reporting occasion or a processing time of one or more SSBs received during the SSB occasion, and a fourth duration corresponds to a time between the start time of the DRX on duration occasion and an end time for one of the DRX on duration occasion or the processing time of the one or more SSBs received during the SSB occasion;

wherein determining whether to skip the WUS monitoring occasion comprises skipping the WUS monitoring occasion based at least in part on a sum of the first duration and the second duration being greater than the fourth duration.

17. The method of claim 16, wherein:

a third duration corresponds to a time between a start time of the SSB occasion and the start time of the DRX on duration occasion.

18. The method of claim 17, wherein determining whether to skip the WUS monitoring occasion comprises:

skipping the WUS monitoring occasion based at least in part on a first sum of the first duration and the second duration being greater than a second sum of the third duration and the fourth duration.

19. The method of claim 18, wherein the start time of the SSB occasion is prior to the start time of the DRX on duration occasion.

20. The method of claim 16, wherein the start time of the SSB occasion is after the start time of the DRX on duration occasion.

21. The method of claim 16, wherein receiving the one or more control signals comprises:

receiving the one or more control signals indicating the information associated with the set of occasions, wherein the information indicates an absence of the SSB occasion for the TTI, and wherein, based at least in part on the absence of the SSB occasion for the TTI:

the second duration corresponds to a time between the start time of the DRX on duration occasion and the end time of the CSI reporting occasion; and the fourth duration corresponds to a time between the start time of the DRX on duration occasion and the end time of the DRX on duration occasion.

22. The method of claim 16, wherein determining whether to skip the WUS monitoring occasion comprises:

monitoring during the WUS monitoring occasion, wherein the one or more control signals further indicate a set of SSB occasions that comprises the SSB occasion, the set of SSB occasions associated with monitoring for periodic transmission of one or more SSBs; and monitoring for the one or more SSBs during a first SSB occasion of the set of SSB occasions based at least in part on a start time of the first SSB occasion being within a duration of a time window that spans the WUS monitoring occasion and the CSI reporting occasion.

23. The method of claim 22, wherein the information of the one or more control signals indicates an absence of the CSI reporting occasion for the TTI, and wherein the time window spans the WUS monitoring occasion based at least in part on the absence of the CSI reporting occasion.

24. The method of claim 16, wherein determining whether to skip the WUS monitoring occasion comprises:

skipping the WUS monitoring occasion, wherein the one or more control signals further indicate a set of SSB occasions that comprises the SSB occasion, the set of SSB occasions associated with monitoring for periodic transmission of one or more SSBs; and monitoring for the one or more SSBs during a first SSB occasion of the set of SSB occasions based at least in part on a start time of the first SSB occasion being within a duration from the DRX on duration occasion.

25. The method of claim 16, wherein:

the one or more control signals further indicate a set of SSB occasions that comprises the SSB occasion;

the set of SSB occasions are associated with monitoring for a periodic transmission of one or more SSBs;

a start time of a first SSB occasion of the set of SSB occasions is prior to the WUS monitoring occasion;

a start time of a second SSB occasion of the set of SSB occasions is after the WUS monitoring occasion and prior to the DRX on duration occasion;

an SSB period corresponds to a duration of time between the start time of the first SSB occasion and the second SSB occasion;

the WUS monitoring occasion is associated with a first lead time that is directly prior to the WUS monitoring occasion; and the DRX on duration occasion is associated with a second lead time that is directly prior to the DRX on duration occasion.

26. The method of claim 16, wherein the one or more control signals comprise one or more radio resource control signals, one or more system information signals, or a combination thereof.

27. A user equipment (UE) for wireless communications, comprising:

means for receiving one or more control signals indicating information associated with a set of occasions for a transmission time interval (TTI) corresponding to a low power operation mode of the UE, the set of occasions comprising a wake up signal (WUS) monitoring occasion, a synchronization signal block (SSB) occasion, a channel state information (CSI) reporting occasion, and a discontinuous reception (DRX) on duration occasion; and means for determining whether to skip the WUS monitoring occasion based at least in part on a respective duration and a respective start time for each occasion of the set of occasions associated with the information indicated by the one or more control signals wherein a first duration corresponds to a time between a start time of the WUS monitoring occasion and a start time of the DRX on duration occasion, a second duration corresponds to a time between the start time of the DRX on duration occasion and an end time for one of the CSI reporting occasion or a processing time of one or more SSBs received during the SSB occasion, and a fourth duration corresponds to a time between the start time of the DRX on duration occasion and an end time for one of the DRX on duration occasion or the processing time of the one or more SSBs received during the SSB occasion;

wherein means for determining whether to skip the WUS monitoring occasion comprises means for skipping the WUS monitoring occasion based at least in part on a sum of the first duration and the second duration being greater than the fourth duration.

28. A non-transitory computer-readable medium storing code for wireless communications at a user equipment (UE), the code comprising instructions executable by one or more processors to:

receive one or more control signals indicating information associated with a set of occasions for a transmission time interval (TTI) corresponding to a low power operation mode of the UE, the set of occasions comprising a wake up signal (WUS) monitoring occasion, a synchronization signal block (SSB) occasion, a channel state information (CSI) reporting occasion, and a discontinuous reception (DRX) on duration occasion; and determine whether to skip the WUS monitoring occasion based at least in part on a respective duration and a respective start time for each occasion of the set of occasions associated with the information indicated by the one or more control signals, wherein a first duration corresponds to a time between a start time of the WUS monitoring occasion and a start time of the DRX on duration occasion, a second duration corresponds to a time between the start time of the DRX on duration occasion and an end time for one of the CSI reporting occasion or a processing time of one or more SSBs received during the SSB occasion, and a fourth duration corresponds to a time between the start time of the DRX on duration occasion and an end time for one of the DRX on duration occasion or the processing time of the one or more SSBs received during the SSB occasion;

wherein determining whether to skip the WUS monitoring occasion comprises skipping the WUS monitoring occasion based at least in part on a sum of the first duration and the second duration being greater than the fourth duration.

* * * * *